(12) United States Patent
Nakamura

(10) Patent No.: US 7,635,190 B2
(45) Date of Patent: Dec. 22, 2009

(54) PROJECTOR

(75) Inventor: Kunihisa Nakamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 541 days.

(21) Appl. No.: 11/507,302

(22) Filed: Aug. 21, 2006

(65) Prior Publication Data
US 2007/0052935 A1 Mar. 8, 2007

(30) Foreign Application Priority Data
Sep. 6, 2005 (JP) ............................ 2005-257906

(51) Int. Cl.
G03B 21/14 (2006.01)
G03B 3/00 (2006.01)
G03B 21/22 (2006.01)
G02B 7/02 (2006.01)

(52) U.S. Cl. .................. 353/101; 353/69; 353/100; 353/119; 359/813; 359/814

(58) Field of Classification Search ............. 353/69, 353/100–101, 119, 122; 359/811–813, 823; D08/300, 341, 338
See application file for complete search history.

(56) References Cited

U.S. PATENT DOCUMENTS

| | | | | |
|---|---|---|---|---|
| 973,962 A * | 10/1910 | Oliver | .................. | 353/31 |
| 2,429,164 A * | 10/1947 | Mast et al. | .................. | 359/826 |
| 2,559,994 A * | 7/1951 | Paludan | .................. | 131/246 |
| 6,351,907 B1 * | 3/2002 | Otteman | .................. | 42/120 |
| 7,014,324 B2 * | 3/2006 | Jang | .................. | 353/101 |
| 2005/0024596 A1 * | 2/2005 | Kuroda et al. | .................. | 353/34 |
| 2005/0030491 A1 * | 2/2005 | Gishi | .................. | 353/101 |
| 2005/0030492 A1 * | 2/2005 | Gishi | .................. | 353/101 |

FOREIGN PATENT DOCUMENTS

JP A-2004-205686 A 7/2004

* cited by examiner

Primary Examiner—Diane I Lee
Assistant Examiner—Jori S Byrne-Diakun
(74) Attorney, Agent, or Firm—AdvantEdge Law Group, LLC

(57) ABSTRACT

A projector includes a light source, an optical modulation device to form an optical image, a projection optical device, and a projection position adjusting device to adjust the projection position. The projection position adjusting device includes a fixed member, a moving member a dial knob, a drive mechanism that transmit rotation of the dial knob, and a reference position detecting mechanism. The reference position detecting mechanism includes a spiral rail guiding section having a groove shape provided to a side face of the dial knob adjacent to the fixed member, along the rotational direction of the dial knob, a sliding section that slides in the guiding section with the rotation of the dial knob, and an engaging section provided to the guiding section, and engages with the sliding section upon the projection position of the projection optical device reaching the projection reference position.

6 Claims, 15 Drawing Sheets

F I G. 7
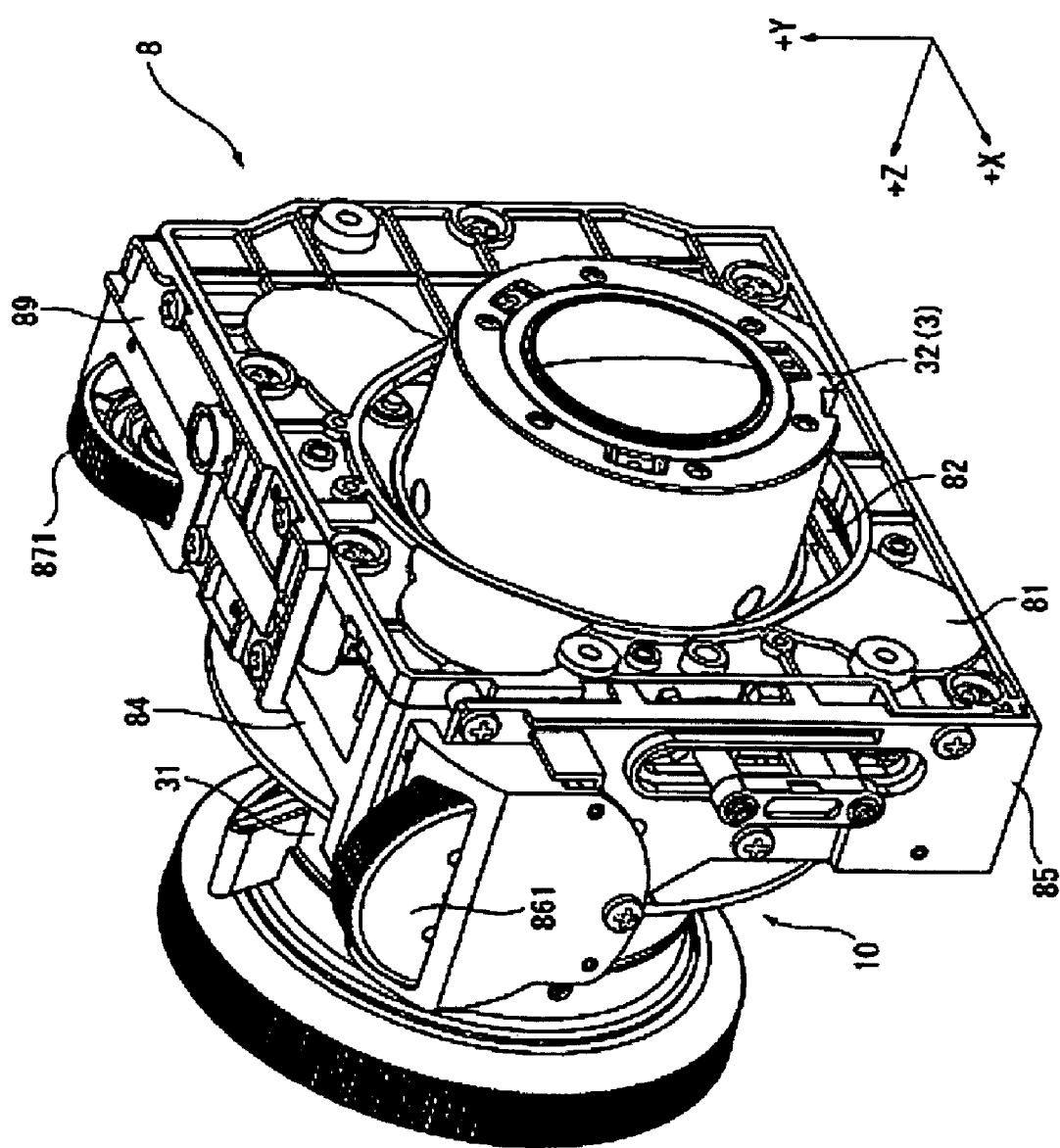

PROJECTOR

BACKGROUND

1. Technical Field

The present invention relates to a projector.

2. Related Art

In the past, a projector provided with a light source lamp, a liquid crystal panel for modulating light beam emitted from the light source lamp in accordance with image information, and a projection lens in an enlarged manner for projecting the modulated light beam to the outside has been known.

When using a projector, there are some cases in which the projected image needs to be displayed shifted in a vertical or a horizontal direction on the screen while keeping the setting posture of the projector. In accordance with such a need, a projector equipped with a projection position adjusting device has been provided (for example, refer to JP-A-2004-205686). The projection position adjusting device is a device capable of moving the projection lens along a plane perpendicular to the projection direction. The projector equipped with such a projection position adjusting device cam display the projection image shifted in a vertical or a horizontal direction on the screen.

Specifically, the projection position adjusting device is provided with a dial knob exposed from a housing of the projector, and drives the projection lens utilizing the rotational operation of the dial knob.

When the dial knob is turned in one direction by a user, the projection position adjusting device moves the projection lens to the left, for example, along the plane perpendicular to the projection direction. Then, the projected image also moves on the screen to the left. When the dial knob is turned in the opposite direction by a user, the projection position adjusting device moves the projection lens to the right along the plane perpendicular to the projection direction. Then, the projected image also moves on the screen to the right.

As described above, the projection lens reciprocates on a moving path perpendicular to the projection direction in accordance with the rotational direction of the dial knob.

However, in the projector described in JP-A-2004-205686, the user might lose a certain projection reference position in the moving path such as the center point of the moving path while adjusting the projection position of the projector by rotating the dial knob.

SUMMARY

An advantage of the invention is to provide a projector with preferable operability.

In order to gain the advantage, a projector according to an aspect of the invention includes a light source, an optical modulation device that modulates light beam emitted from the light source in accordance with image information to form an optical image, a projection optical device that projects the optical image formed by the optical modulation device in an enlarged manner, a projection position adjusting device that moves the projection optical device in a plane perpendicular to a projection direction to adjust the projection position of the projection optical device, wherein, the projection position adjusting device includes a fixed member fixed to the projector, a moving member capable of moving along the plane perpendicular to the projection direction with respect to the fixed member, a dial knob supported rotatably with respect to the fixed member and operable by a user, a drive mechanism that is engaged with the moving member and the dial knob, and transmits rotation of the dial knob to the moving member to move the moving member, a reference position detecting mechanism that is disposed between the fixed member and the dial knob, and detects a projection reference position of the projection optical device, the reference position detecting mechanism including a guiding section provided to a side face of the dial knob adjacent to the fixed member, along the rotational direction of the dial knob, and shaped like a groove, a sliding section that is provided to the fixed member, and slides in the guiding section in accordance with the rotation of the dial knob, and an engaging section that is provided to the guiding section, and engages with the sliding section in the case in which the projection position of the projection optical device reaches the projection reference position.

Here, as the projection reference position, for example, the center position of the adjustable range of the projection position, namely, the moving path of the projection optical device in a plane perpendicular to the projection direction can be cited.

According to this aspect of the invention, the user adjusts the projection position of the projector while rotating the dial knob by hand. Then, in the projection position adjusting device of the projector, the moving member is moved in accordance with the rotation of the dial knob, and the projection optical device supported by the moving member is moved along the moving path in a plane perpendicular to the projection direction. In this case, in the reference position detecting mechanism, sliding section slides along the guiding section in accordance with the rotation of the dial knob.

When the projection position of the projection optical device eventually reaches the projection reference position, the sliding section engages with the engaging section in the guiding section of the reference position detecting mechanism. And, if the dial knob is continued to be rotated, the engagement between the sliding section and the engaging section is released, and the sliding section slides again in the guiding section in accordance with the rotation of the dial knob. In this case, the engagement and release between the sliding section and the engaging section causes the dial knob a slight vibration and click sound. The user who is rotating the dial knob can feel the vibration by hand.

Thus, while a user is adjusting the projection position turning the dial knob, the user can recognize the projection position when the vibration of the dial knob or the click sound is felt as the reference position. Therefore, according to the projector of this aspect of the invention, it is possible to notice the user that the projection position reaches the reference position in adjusting the projection position, with relatively simple configuration and in a manner easy-to-understand to the user.

In the projector according to another aspect of the invention, the engaging section is preferably a recessed section provided to the bottom of the guiding section, and the sliding section preferably slides in accordance with the rotation of the dial knob while pressing the bottom of the guiding section and engages with the engaging section in the case in which the projection position of the projection optical device reaches the projection reference position.

According to this aspect of the invention, the sliding section pressing the bottom of the guiding section moves in the pressing direction to engage with the engaging section as a recessed section formed on the bottom of the guiding section. Thus, the vibration caused on the dial knob by the engagement becomes clear. Therefore, the user can clearly feel the vibration of the dial knob, and can clearly recognize that the projection position reaches the reference position.

Further, the engaging section, which is a recess section of the bottom of the guiding section, can easily be formed.

Further, according the pressing force, the configuration of the sliding section to be engaged with the recessed section can also be simplified.

In the projector according to another aspect of the invention, the guiding section preferably has a spiral shape along the rotational direction of the dial knob, and the sliding section is preferably attached to the fixed member movably in a direction perpendicular to the rotational axis of the dial knob.

In the projection position adjusting device having a relatively large moving range of the moving member, the dial knob is rotated plural revolutions to move the moving member in one direction. However, if the projection reference position is unique in the moving path, for example, the projection reference position is the center of the moving path of the projection optical device, it is preferable that the engagement and release between the sliding section and the engaging section occurs only once in the one way rotation of the dial knob.

Here, according to this aspect of the invention, the sliding section slides in the guiding section having the spiral shape, and reciprocates on the fixed member in the direction perpendicular to the rotational axis direction according to the position in the spiral. Therefore, in the rotation of the dial knob in one way, the sliding section never slides on the same position of the guiding section more than once.

Namely, if the engaging section formed in the guiding section is unique, in the one-way rotation of the dial knob, engagement and its release between the sliding section and the engaging section occur only once. Therefore, this aspect of the invention can applied to a projector having a projection position adjusting device with large movement range of the moving member.

In the projector according to another aspect of the invention, the sliding section preferably includes a sliding body including a sliding head that engages with the engaging section, and a base section that is attached to the fixed member, and supports the sliding body so that the sliding head swings according to the rotational direction of the dial knob.

In this case, a configuration can be adopted in which, as the drive mechanism, for example, a plurality of gears meshed with each other are provided, and these gears are driven in accordance with the rotation of the dial knob to move the moving member.

However, when the dial knob is rotated in the inverse direction from the direction in which the dial knob has been rotated, the backlash in accordance with the engagement gap between the gears is caused, and an error that the position of engagement between the sliding section and the engaging section is shifted from the projection reference position might be caused in the reference position detecting mechanism.

In response, according to this aspect of the invention, the sliding body is supported by the base section so that the sliding body can swing in the rotational direction of the dial knob, and therefore, if the dial knob is rotated, the sliding body swings in the rotational direction around the base section with the help of friction caused between the sliding head and the guiding section. By making the displacement of the sliding head in the rotational direction caused by the swinging operation correspond to the backlash of the gears, while the gap is caused in the mesh of the gears, it is possible to prevent the sliding head from sliding along the guiding section. Therefore, the projector according to the invention can reduce the error in detecting the reference position which is caused by the backlash of the gears.

In the projector according to another aspect of the invention, the base section is provided with a pair of projections projected towards the sliding body at positions symmetrical with the rotational direction of the dial knob with respect to the sliding head in the condition in which the base section supports the sliding body, and the sliding body is preferably provided with a pair of insertion holes to which the pair of projections are respectively inserted.

In the projector according to this aspect of the invention, in the sliding section, a pair of insertion holes in the sliding body and a pair of projections in the base section are formed at positions symmetrical in the rotational direction, and the projections are respectively inserted in the insertion holes. Accordingly, if the sliding body is caused to swing in the direction perpendicular to the rotational direction of the dial knob, the edge of the insertion hole engages with the projection, and therefore, swinging movement of the sliding body in the direction perpendicular to the rotational direction of the dial knob is prevented. Therefore, according to this aspect of the invention, jerky movement of the sliding body in the direction perpendicular to the rotational direction of the dial knob with respect to the base section can be prevented.

In the projector according to another aspect of the invention, the guiding section is preferably provided with a rotation stopper, which engages with the sliding section to stop rotation of the dial knob, at a position corresponding to a moving termination position of the moving member.

According to this aspect of the invention, in the projection position adjusting device, when the moving member is moved by the drive mechanism to the moving termination position, sliding section is abutted by the rotation stopper in the reference position detecting mechanism. Since the sliding section is abutted on the rotation stopper, the dial knob becomes impossible to be rotated any further. Namely, according to the projector of this aspect of the invention, when the moving member reaches the moving termination position, the rotation of the dial knob is restricted.

Therefore, in the projector according to this aspect of the invention, it can be prevented that load is applied to various members in the projection position adjusting device when the dial knob is further rotated after the moving member reaches the moving termination position.

BRIEF DESCRIPTION OF THE DRAWINGS

The invention will now be described with reference to the accompanying drawings, wherein like numbers refer to like elements.

FIG. 7 is a perspective view of a projection position adjusting device according to the embodiment viewed from the back side thereof in the projection direction.

DESCRIPTION OF EXEMPLARY EMBODIMENTS

An embodiment of the invention will hereinafter be explained with reference to the accompanying drawings.

1. External Configuration

Figure 1:
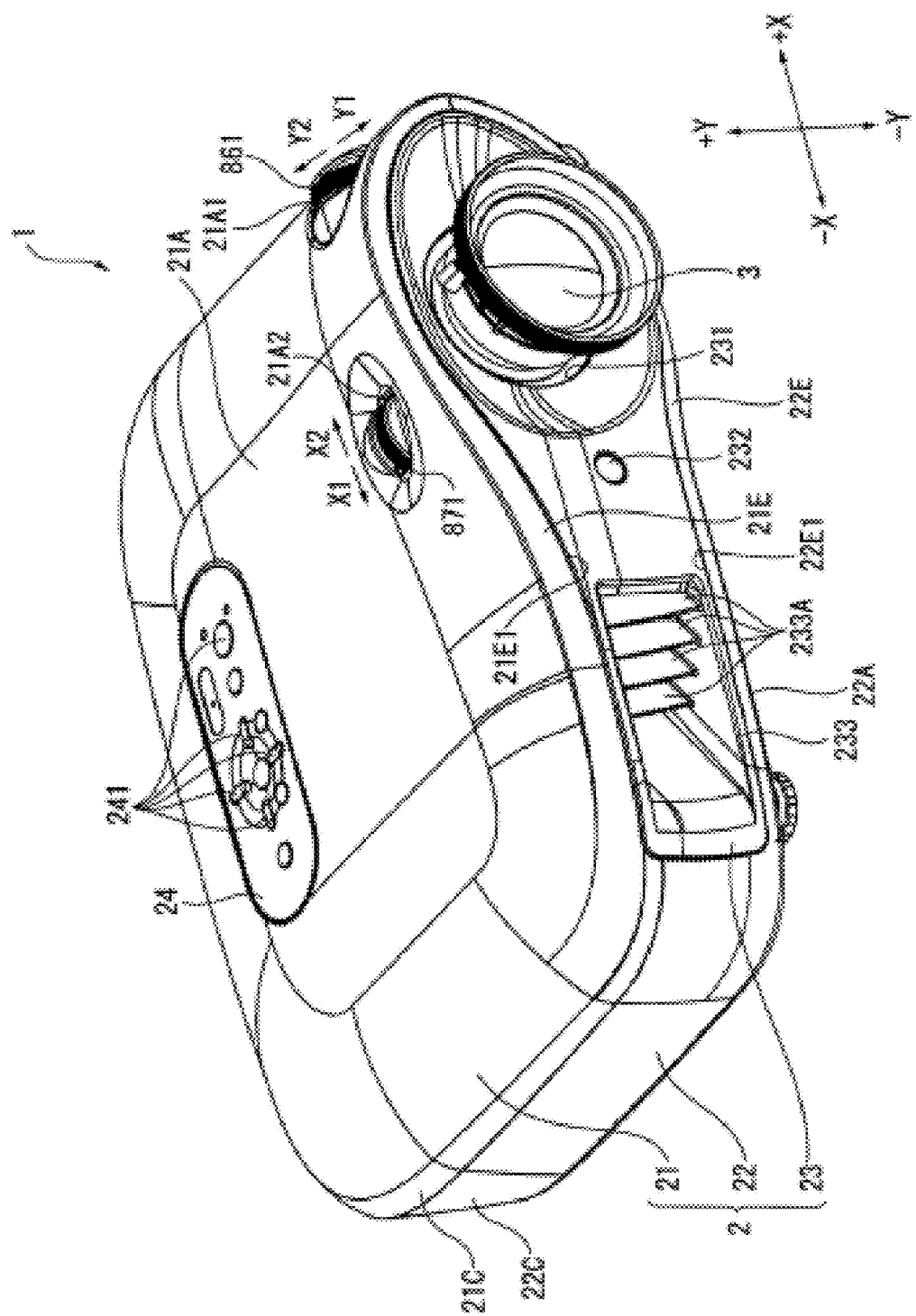
FIG. 1 is a perspective view showing an external appearance of a projector according to the present embodiment.
Figure 2:
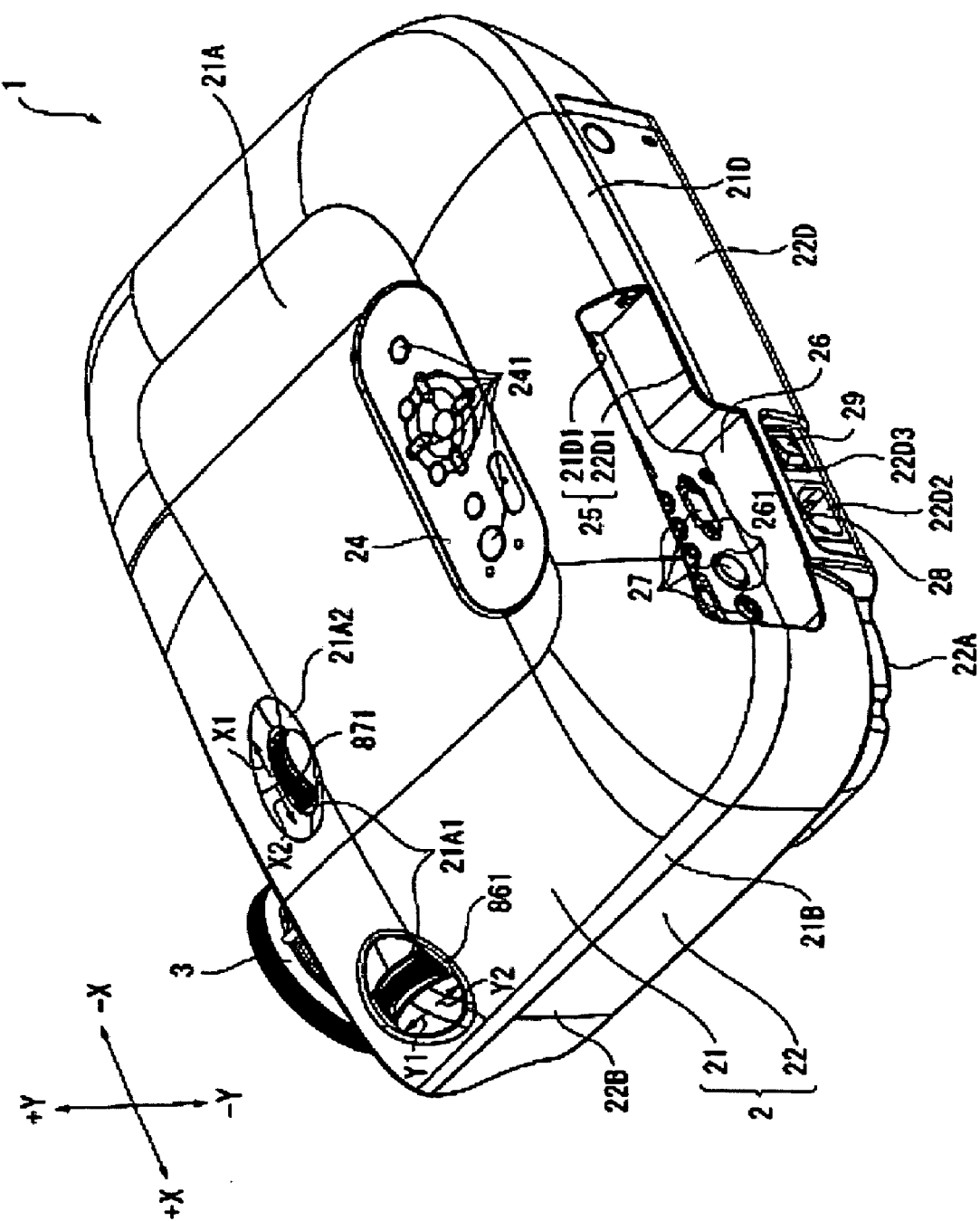
FIG. 2 is a perspective view showing an external appearance of the projector according to the embodiment.

FIGS. 1 and 2 are the perspective views showing the external appearance of a projector 1. Specifically, FIG. 1 is the perspective view showing the projector 1 viewed from an upper front side thereof. FIG. 2 is the perspective view of the projector 1 viewed from an upper rear side thereof.

The projector 1 is for forming an optical image by modulating an optical beam emitted from the light source in accordance with image information, and projecting the formed optical image on a screen (not shown) in an enlarged manner. As shown in FIG. 1 or 2, the projector 1 is provided with a substantially cuboid shaped exterior chassis 2, and a projection lens 3 as the projection optical device exposed from the exterior chassis 2.

The projection lens 3 is configured as a set of lenses composed of a plurality of lenses housed in a cylindrical body tube, and performs enlarged projection of the image light modulated by a main body of the projector 1 in accordance with the image information.

The exterior chassis 2 is made of synthetic resin, and houses the main body of the projector 1. As shown in FIG. 1 or 2, the exterior chassis 2 is provided with an upper case 21 covering the upper part of the main body of the device, a lower case 22 covering the lower part of the main body of the device, and a front case 23 (see FIG. 1) covering the front face of the main body of the device.

The upper case 21 is, as shown in FIG. 1 or 2, composed of a top face section 21A, side face sections 21B (see FIG. 2), 21C (see FIG. 1), a back face section 21D (see FIG. 2), and a front face section 21E (see FIG. 1) forming the top face, a part of the side face, a part of the back face, and a part of the front face of the exterior chassis 2, respectively.

The top face section 21A has, as shown in FIG. 1 or 2, a substantially rectangular shape in the plan view, and smoothly curves from substantially the center section thereof to the front face side, side face sides, and the back face side, thus forming a convex curve shape.

In a front right area of the top face section 21A viewed from the front side thereof, there are formed two opening sections 21A1, 21A2 as shown in FIG. 1 or 2. And, the two opening sections 21A1, 21A2 each expose a part of respective one of dial knobs 861, 871 capable of operating the projection lens 3 for performing projection position adjustment of a projection image projected on the screen (not shown).

Specifically, as shown in FIG. 1, the opening section 21A1 on the front side of the top face and right in the front view from the front exposes the dial knob 861 forming a projection position adjusting device 8 (see FIGS. 6 and 7) described later. The opening section 21A2 positioned left in view from the front exposes the dial knob 871 similarly forming the projection position adjusting device 8.

As shown in FIG. 1 or 2, when the dial knob 861 out of the two dial knobs 861, 871 is turned in the Y1 direction (towards the front side), the projection lens 3 moves in the −Y direction (downward), and when the dial knob 861 is turned in the Y2 direction (towards the back side), the projection lens 3 moves in the +Y direction (upward). Further, when the dial knob 871 is turned in the X1 direction (to the right viewed from the back side of the projector 1), the projection lens 3 moves in the −X direction (to the right), and when the dial knob 871 is turned in the X2 direction (to the left viewed from the back side of the projector 1), the projection lens 3 moves in the +X direction (to the left).

It should be noted that the detailed structure of the projection position adjusting device 8 will be described later.

Further, as shown in FIG. 1 or 2, in a rear side of the openings 21A1 of the top face section 21A, there is provided an operation panel 24 for performing start-up and adjustment operations of the projector 1 extending in a longitudinal direction. When operation buttons 241 of the operation panel 24 are properly pushed down, they contact tactile switches mounted on a circuit board (not shown) disposed inner than the operation buttons 241, thereby making desired operations possible. Further, a light emitting diode (LED, not shown) is attached to the circuit board, and is arranged to emit light in accordance with a predetermined operation.

It should be noted that the circuit board of the operation panel 24 is electrically connected to a control board (not shown), and operation signals caused by pushing down the operation buttons 241 are output to the control board.

The side face sections 21B, 21C, the back face section 21D, and the front face section 21E are sections substantially hanging from respective edges of the rectangular shape in the plan view of the top face section 21A as shown in FIG. 1 or 2.

In the back face section 21D among these sections, in the left side area thereof viewed from the back face side, there is formed a notch 21D1 shaped like a bracket in the plan view from the lower edge towards the upper side as shown in FIG. 2.

Further, in the front face section 21E, as shown in FIG. 1, there is formed a notch 21E1 shaped like a bracket in the plan view from the lower edge towards the upper side.

The lower case 22 is, as shown in FIG. 1 or 2, composed of a bottom face section 22A, side face sections 22B (see FIG. 2), 22C (see FIG. 1), a back face section 22D (see FIG. 2), and a front face section 22E (see FIG. 1) forming the bottom face, a part of the side face, a part of the back face, and a part of the front face of the exterior chassis 2, respectively.

The bottom face section 22A, although not shown specifically in the drawings, is composed of a substantially rectangular flat face. And, the bottom face section 22A is provided with a plurality of foot sections for grounding on a grounding face such as a desk, and an air intake for leading the cooling air into the projector 1 from the outside.

The side face sections 22B, 22C, the back face section 22D, and the front face section 22E are sections standing from respective edges of the rectangular shape in the plan view of the bottom face section 22A as shown in FIG. 1 or 2.

In the back face section 22D among these sections, in the left side area thereof viewed from the back face side, there is formed a notch 22D1 shaped like a bracket in the plan view from the upper edge towards the lower side as shown in FIG. 2. And, the notches 21D1, 22D1 are connected to each other to form an opening section 25 in the condition in which the upper case 21 and the lower case 22 are combined with each other. In the opening section 25, as shown in FIG. 2, there is fitted to be fixed a connecting terminal installing section 26 having an outline shape corresponding to the shape of the opening section 25.

The connecting terminal installing section 26, as shown in FIG. 2, hollows inward from the end faces of the back face sections 21D, 22D to form a cross-sectional shape of a substantially bracket shape, and provided with a plurality of holes 261 formed therein. And, as shown in FIG. 2, a plurality of connecting terminals 27 for inputting an image signal, an audio signal, and so on from external electronic equipment are exposed through the plurality of holes 261. Further, inside the connecting terminal installing section 26, there is disposed an interface board (not shown) for processing the signals input from the connecting terminals 27.

It should be noted that the interface board is electrically connected to a control board (not shown), and the signals processed in the interface board are output to the control board.

Further, in the back face section 22D, under the notch 22D1, there are formed two opening sections 22D2, 22D3 as shown in FIG. 2. And, as shown in FIG. 2, an inlet connector 28 is exposed through the opening section 22D2 located left in a back side view, making it possible to supply the main body of the projector 1 with electricity from the outside. Further, as shown in FIG. 2, a power switch 29 is exposed through the opening section 22D3 located right in the back side view, and by switching the power switch 29, it becomes possible to switch ON or OFF the main power of the projector 1.

It should be noted that the power switch 29 is electrically connected to the control board (not shown), and an operation signal caused by switching of the power switch 29 is output to the control board.

Further, in the front face section 22E, as shown in FIG. 1, there is formed a notch 22E1 shaped like a bracket in the plan view from the upper edge towards the lower side. And, the front case 23 is fixedly supported by an inner section of the bracket-shaped notch 21E1 of the front face section 21E and an inner section of the bracket-shaped notch 22E1 of the front face section 22E in the condition in which the upper case 21 and the lower case 22 are combined.

The front case 23, as shown in FIG. 1, has a substantially oval shape elongated in a horizontal direction, and closes up the opening section formed of the notches 21E1, 22E1 when the upper case 21 and the lower case 22 are connected to each other.

In the right area of the front case 23 in the front view, as shown in FIG. 1, there is formed a concave hollowing towards the inside of the exterior chassis 2 and having substantially circular opening 231 at the bottom thereof. And, the opening 231 exposes a tip portion of the projection lens 3.

Further, in the front case 23, at substantially the central section in the longitudinal direction, there is formed a sensor window 232 for remote control, as shown in FIG. 1. And further, on the inner side of the sensor window 232 for the remote control, there is disposed a remote control sensor module (not shown) for receiving an operation signal from a remote controller (not shown).

It should be noted that the remote controller is provided with similar things to the start-up switch, the adjusting switch, and so on provided to the operation panel 24 described above. And, when the remote controller is operated, an infrared signal is output from the remote controller, and the infrared signal is received by the sensor module for remote control via the sensor window 232 for remote control, and then processed by the control board (not shown).

Further, in the front case 23, in the left area in the front view, there is formed an air outlet 233 having a substantially rectangular shape in the plan view for discharging air heated inside the projector 1 to the outside as shown in FIG. 1.

Further, the periphery section of the air outlet 233 is formed to have a tubular shape protruding towards the inside as shown in FIG. 1. More specifically, the periphery section of the air outlet 233 is formed to have a tubular shape protruded towards a direction coming close to the projection lens 3 at a predetermined angle with the projection direction of the projection lens 3. And, in the inside of the tubular shape section of the air outlet 233, there are formed a plurality of louver boards 233A each built from the top to the bottom thereof and extended in the direction of the protrusion of the periphery section of the air outlet 233 as shown in FIG. 1.

2. Internal Configuration

Figure 3:
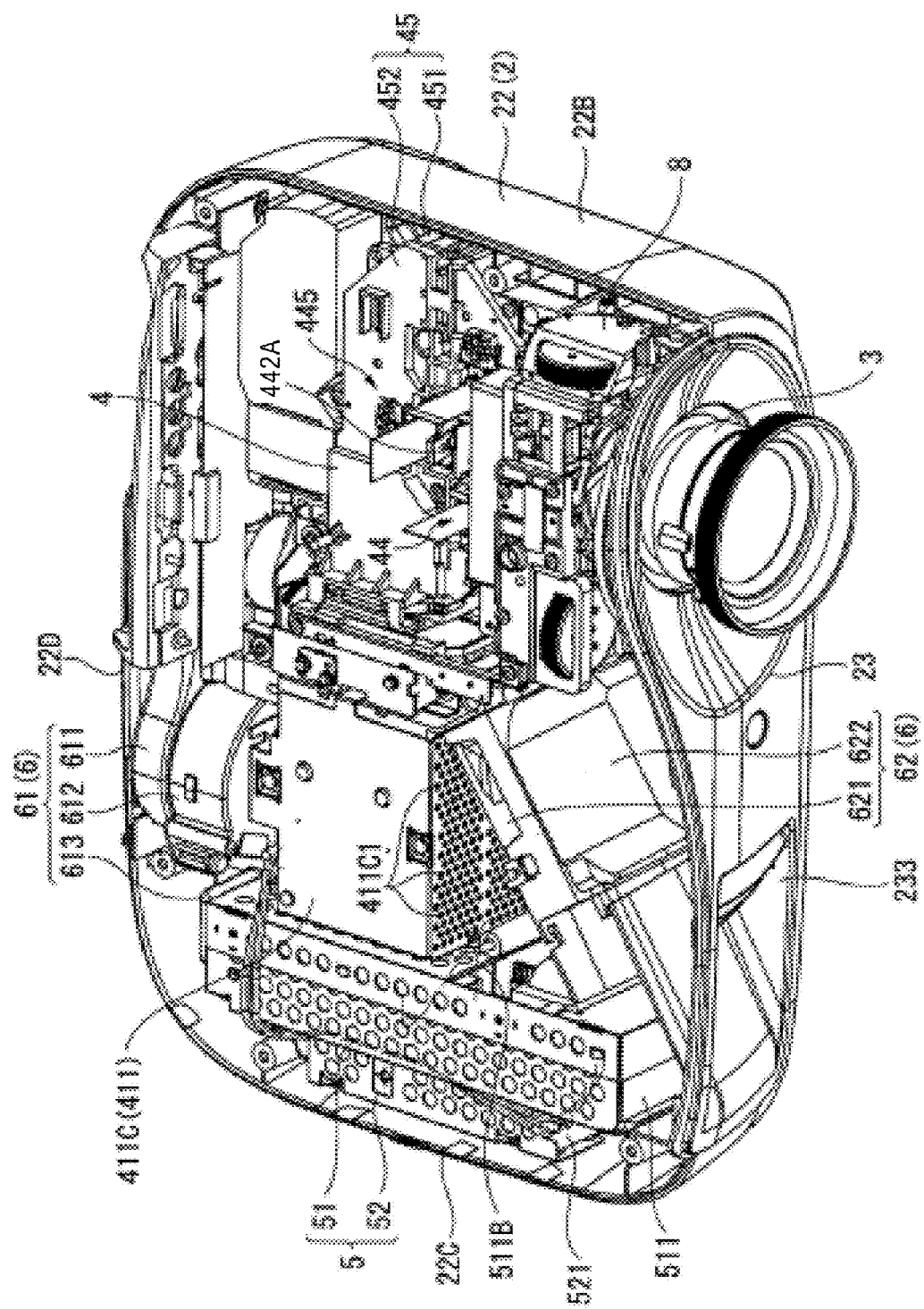
FIG. 3 is a view showing the internal configuration of the projector according to the embodiment.
Figure 4:
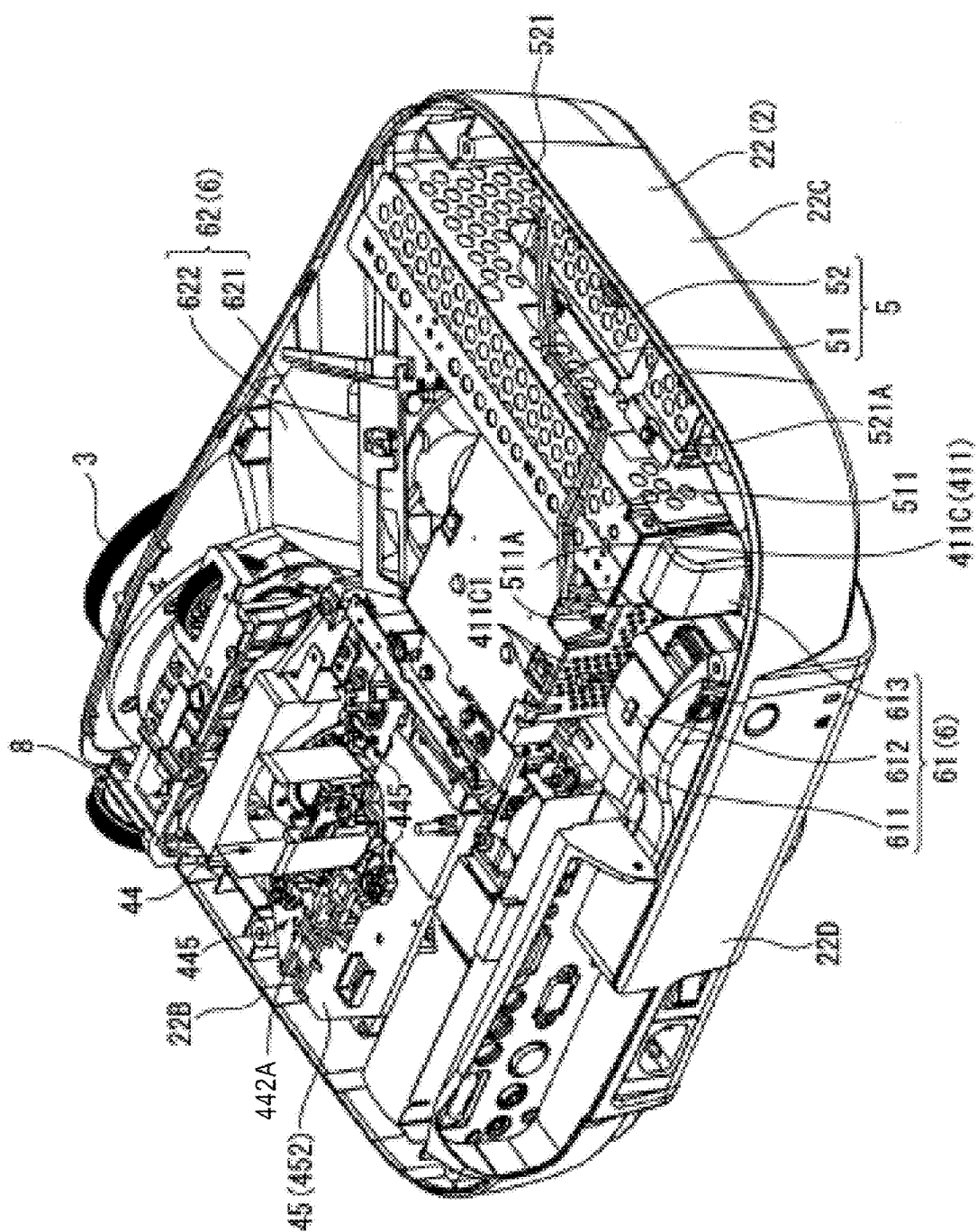
FIG. 4 is a view showing the internal configuration of the projector according to the embodiment.

FIGS. 3 and 4 are the views showing the internal configuration of the projector 1. Specifically, FIG. 3 is a perspective view of the condition with the upper case 21 and the control board removed therefrom viewed from the upper front side thereof. FIG. 4 is a perspective view of the condition with the upper case 21 and the control board removed therefrom viewed from the upper back side thereof.

Inside the exterior chassis 2, there is housed a main body of the projector 1 as shown in FIG. 3 or 4. The main body of the device is composed of an optical unit 4 as an image projection unit, a power supply unit 5, a cooling unit 6, and so on.

It should be noted that, although not shown in the drawings, the main body of the device is provided with the control board disposed above the optical unit 4 and for controlling the projector 1 as a whole, besides the optical unit 4, the power supply unit 5, and the cooling unit 6.

3. Detailed Configuration of Optical Unit

Figure 5:
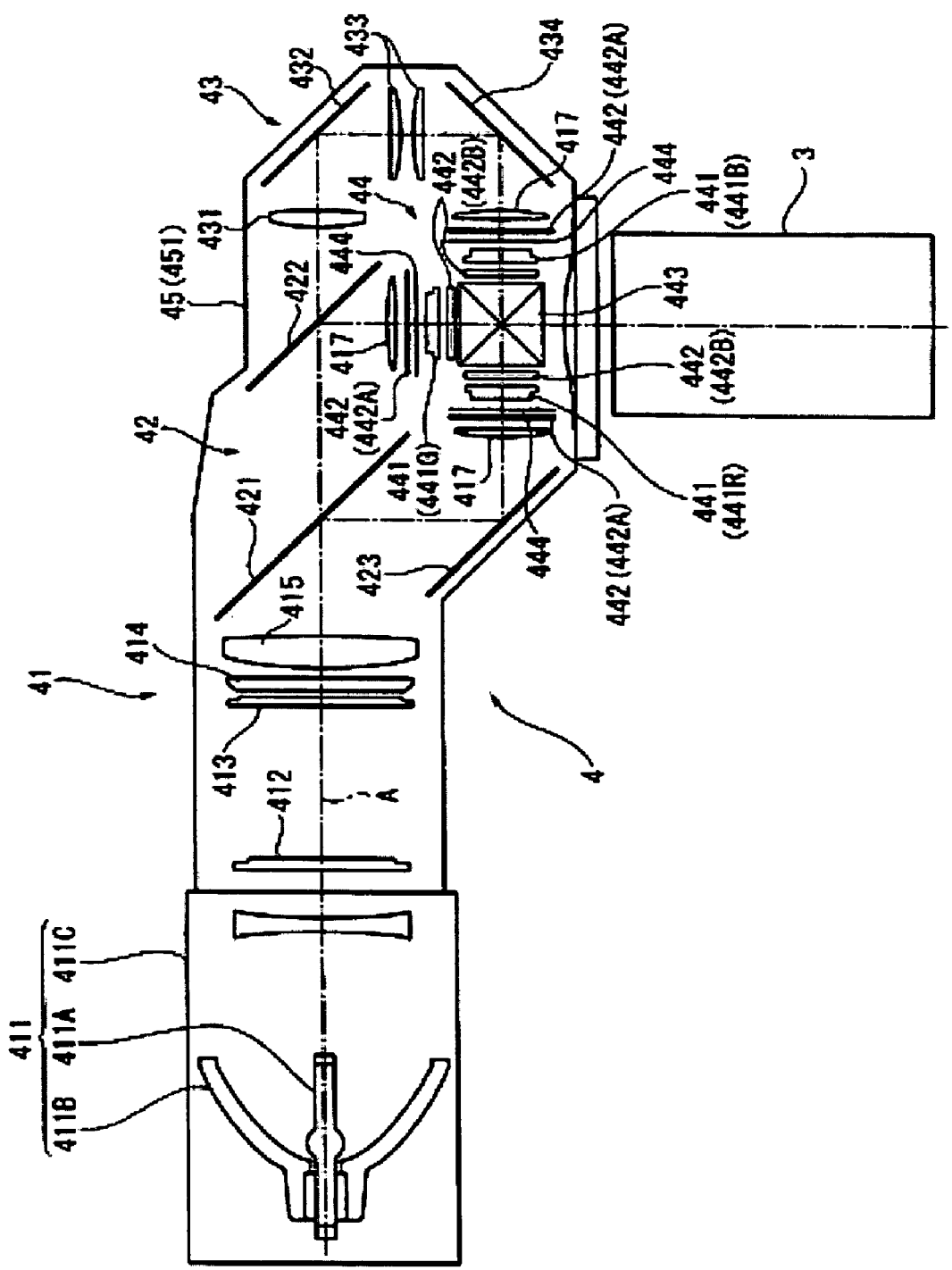
FIG. 5 is a plan view schematically showing an optical system of an optical unit according to the embodiment.

FIG. 5 is a plan view schematically showing the optical system of the optical unit 4.

The optical unit 4 forms an image light beam in accordance with image information under control of the control board. The optical unit 4 has an L-shape in the plan view extending in a lateral direction along the back face sections 22D and extending towards the front along the side face section 22B inside the exterior chassis 2 as shown in FIG. 3 or 4.

The optical unit 4 is provided with an integrator illuminating optical system 41, a color separator optical system 42, a relay optical system 43, an electro-optic device 44, and an optical component chassis 45 made of synthetic resin for housing these optical components 41 through 44 and for fixedly supporting the projection lens 3 at a predetermined position as shown in FIG. 5.

The integrator illuminating optical system 41 is an optical system for substantially equally illuminating an image forming area of each of liquid crystal panels described below forming the electro-optical device 44. The integrator illuminating optical system 41 is provided with a light source device 411, a first lens array 412, a second lens array 413, a polarization converter 414, and an overlapping lens 415 as shown in FIG. 5.

The light source device 411 is provided with a light source lamp 411A as a light source for emitting radial light beams, a reflector 411B for reflecting the radial light beams emitted from the light source lamp 411A, and a lamp housing 411C (see FIGS. 3 through 5). As the light source lamp 411A, a halogen lamp, a metal halide lamp, or a high-pressure mercury vapor lamp is often used. As a reflector 411B, a parabolic mirror is used. It should be noted that, besides the parabolic mirror, an ellipsoidal mirror can be used together with a concave collimation lens.

The lamp housing 411C is for accommodating the light source lamp 411A and the reflector 411B inside thereof, and is fixed to the bottom section of the lower case 22 and connected to the optical components chassis 45.

The first lens array 412 has a configuration in which small lenses each having a substantially rectangular outline viewed in the optical axis direction are arranged in a matrix. The small lenses divide the beam emitted from the light source lamp 411A into a plurality of partial light beams.

The second lens array 413 has substantially the same configuration as the first lens array 412, namely the configuration having small lenses arranged in a matrix. The second lens array 413, in conjunction with the overlapping lens 415, has a function of focusing the image of the small lenses of the first lens array 412 on the liquid crystal panel described below.

The polarization converter 414 is disposed posterior to the second lens array in the optical path. Such a polarization converter 414 is for converting the light from the second lens array 413 into a substantially single polarized light beam, and thus enhancing the light efficiency in the electro-optic device 44.

Specifically, each of the partial light beams converted into a substantially single polarized light beam by the polarization converter 414 is finally overlapped substantially on each of the liquid crystal panels of the electro-optic device 44 described later by the overlapping lens 415. In the projector 1 of the present embodiment using a type of the liquid crystal panel of converting polarized light beams, since only a single polarized light beam is available, almost a half of the light beam from the light source lamp 411A emitting other random polarized light beams is not available. Therefore, by using the polarization converter 414, almost whole of the light beam emitted from the light source lamp 411A is converted into a single polarized light beam, thereby enhancing light efficiency in the electro-optic device 44.

The color separator optical system 42 is provided with two dichroic mirrors 421, 422 and a reflecting mirror 423, and has a function of separating the plurality of partial light beams emitted from the integrator illuminating optical system 41 into three colored light beams of red, green, and blue by the dichroic mirrors 421, 422.

The relay optical system 43 is provided with an entrance lens 431, a relay lens 433, and reflecting mirrors 432, 434, and has a function of guiding the colored light beams separated by the color separator optical system 42 to the liquid crystal panel for the blue light beam.

In this case, the dichroic mirror 421 of the color separator optical system 42 transmits the blue light component and the green light component of the light beam emitted from the integrator illuminating optical system 41, and reflects the red light component thereof. The red light beam reflected by the dichroic mirror 421 is further reflected by the reflecting mirror 423 and reaches the liquid crystal panel for the red light beam through a field lens 417. The field lens 417 converts each of the partial light beams emitted from the second lens array 413 into a light beam parallel to the center axis (principal ray). The same applies to other field lenses 417 each provided to the light entrance side of the respective liquid crystal panels for green light and blue light.

Out of the blue light beam and the green light beam transmitted through the dichroic mirror 421, the green light beam is reflected by the dichroic mirror 422, and reaches the liquid crystal panel for the green light beam through the field lens 417. Meanwhile the blue light beam is transmitted through the dichroic mirror 422, passes through the relay optical system 43, and then reaches the liquid crystal panel for the blue light beam through the field lens 417. It should be noted that the relay optical system 43 is used for the blue light beam for preventing degradation of light efficiency caused by the diffusion of the blue light beam, which has the optical path longer than the optical paths of other colored light beams. Namely, it is provided for transmitting the partial light beams entering the entrance lens 431 directly to the field lens 417. It should be noted that, although it is configured that the blue light beam out of the three colored light beams is transmitted in the relay optical system 43, the configuration is not limited thereto, and it can also be configured that the red light beam is transmitted therein, for example.

The electro-optic device 44 is provided with three liquid crystal panels 441 (assuming that a liquid crystal panel for the red light beam is denoted with 441R, a liquid crystal panel for the green light beam is denoted with 441G, and a liquid crystal panel for the blue light beam is denoted with 441B) forming an optical modulation device, polarization plates 442, field angle correction plates 444, and a cross dichroic prism 443.

The liquid crystal panel 441 uses, for example, polysilicon thin film transistors (TFT) as switching elements, and each of the colored light beams separated off by the color separator optical system 42 is modulated by respective one of the three liquid crystal panels 441 and polarization plates 442 disposed on both entrance and exit sides of the liquid crystal panel, respectively, in accordance with the image information to form the optical image.

The polarization plate 442 is provided with an entrance polarization plate 442A and an exit polarization plate 442B disposed on anterior and posterior of the liquid crystal panel 441, respectively, in the optical path.

The entrance polarization plate 442A is for transmitting only a polarized light beam with a predetermined polarizing direction out of each of the colored light beams separated off by the color separator optical system 42 and absorbing other light beams, and is composed of a substrate made of quartz crystal, sapphire, or the like with a polarization film attached thereto. And, the entrance polarization plate 442A is disposed so that the position of the entrance polarization plate can be adjusted with respect to a predetermined illuminating optical axis defined inside the optical component chassis 45 by a position adjusting mechanism described later forming the optical component chassis 45.

The exit polarization plate 442B is also configured similarly to the entrance polarization plate 442A, and is for transmitting only the polarized light beam with the predetermined polarizing direction out of the light beams emitted from the liquid crystal panel 441 and absorbing other light beams. Further, it can be realized by attaching the polarization film to the cross dichroic prism 443 without using the substrate, or by attaching the substrate to the cross dichroic prism 443.

The entrance polarization plate 442A and the exit polarization plate 442B are arranged to have polarization axes, respectively, whose directions are perpendicular to each other.

The field angle correction plate 444 is provided with an optical conversion film formed on the substrate and having a function of correcting the field angle of the optical image formed by the liquid crystal panel 441. By disposing such a field angle correction plate 444 as described above, light leakage on the black screen can be reduced, thus the contrast of the projected image can dramatically be improved. And, similarly to the entrance polarization plate 442A, the field angle correction plate 444 is disposed so that the position of the field angle correction plate can be adjusted with respect to a predetermined illuminating optical axis defined inside the optical component chassis 45 by a position adjusting mechanism described later forming the optical component chassis 45.

The cross dichroic prism 443 is for combining images each modulated for corresponding colored light beam emitted from respective one of the three liquid crystal panels 441 to form a color image. It should be noted that the cross dichroic prism 443 is composed of a dielectric multilayer film for reflecting red light and a dielectric multilayer film for reflecting blue light formed along the boundary faces of four rectangular prisms to form a substantially X shape, and the three colored light beams are combined by these dielectric multilayer films.

The optical systems 41 through 44 as described above are housed inside the optical component chassis 45.

As shown in FIGS. 3 through 5, the illuminating optical axis A (see FIG. 5) of the light beam emitted from the light source device 411 is defined inside the optical component chassis 45, and the optical component chassis 45 is composed of a component housing member 451 (see FIGS. 3 and 5) shaped like a container provided with grooves (not shown) for respectively fitting the optical components 412 through 415, 417, 421 through 423, 431 through 434, 442A, and 444 described above by sliding them from above, a lid member 452 shaped like a lid for closing the upper opening of the component housing member 451, and the position adjusting mechanism 445 (see FIGS. 3 and 4) including a part of the lid member 452 and for performing the position adjustment of both of the entrance polarization plate 442A and the field angle correction plate 444.

Further, in one end of the optical component chassis 45 having a substantially L-shape in the plan view, there is disposed the light source device 411 at a predetermined position with respect to the illuminating optical axis A (see FIG. 5), and in the other end thereof, there is fixed the projection lens 3 at a predetermined position with respect to the illuminating optical axis A. Still further, the electro-optic device 44 is fixed anterior to the projection lens 3 in the optical path. Further, the body tube of the projection lens 3 is fixed to the projection position adjusting device 8 described later.

4. Configuration of Power Supply Unit

The power supply unit 5 is for supplying each of the composing members with electricity supplied from the outside via the inlet connector 28 (see FIG. 2). As shown in FIG. 3 or 4, the power source unit 5 is disposed at the side of the light source device 411 of the optical unit 4 and along the side face section 22C of the exterior chassis 2. As shown in FIG. 3 or 4, the power supply unit 5 is provided with a power supply block 51 and a lamp drive block 52.

The power supply block 51 is disposed at the side of the light source device 411, and supplies the lamp drive block 52, the control board, and so on with the electricity supplied form the outside via the inlet connector 28. The power supply block 51 is provided with a circuit board (not shown) having a transformer for converting alternating current voltage into a predetermined voltage, a converter circuit for converting the output of the transformer into a predetermined direct current voltage, and so on mounted on one surface thereof, and a box-like member 511 for covering the circuit board.

As shown in FIG. 3 or 4, the box-like member 511 has a shape extending in the anteroposterior direction so as to form substantially an L-shape together with the light source device 411. And, the box-like member 511 is provided with a first inlet 511A (see FIG. 4) formed in the back face side and for leading the air from the cooling unit 6 inside thereof, and an outlet 511B (see FIG. 3) formed inner end face of the substantially L-shaped block formed in conjunction with the light source device 411 and for discharging the inside air to the outside. Further, although not shown in the drawings, the box-like member 511 is provided with a second inlet formed on the end face distant from the light source device 411 and for introducing the air discharged from the lamp drive block 52.

The lamp drive block 52 is disposed at the side of the power supply block 51 and along the side face sections 21C, 22C, and provided with a circuit board (not shown) having a converter circuit for supplying the light source device 411 with electricity with a stable voltage and so on mounted on one surface thereof, and the commercial alternating current input from the power supply block 51 is rectified or converted by the lamp drive block 52 into direct current or alternating current rectangular wave, and supplied to the light source device 411. Further, the circuit board of the lamp drive block 52 is housed inside a box-like member 521 similarly to the power supply block 51.

As shown in FIG. 3 or 4, the box-like member 521 has a shape extending in the anteroposterior direction in parallel to the box-like member 511. And, the box-like member 521 is provided with an inlet 521A (see FIG. 4) formed on the back face side and for leading the air from the cooling unit 6 inside thereof, and an outlet (not shown) for discharging the inside air to the outside formed on the end face opposing the box-like member 511 and corresponding to the second inlet of the box-like member 511.

5. Configuration of Cooling Unit

The cooling unit 6 is for cooling the composing elements inside the projector 1. As shown in FIG. 3 or 4, the cooling unit 6 is composed of a power supply unit cooling section 61 for cooling mainly the power supply unit 5, a light source device cooling section 62 for discharging the air inside the projector 1 to the outside, and so on.

It should be noted that, although not specifically shown in the drawings, the cooling unit 6 is also provided with a liquid crystal panel cooling section composed of a cooling fan and a duct for cooling each of the liquid crystal panels 441 and the polarization converter 414, and so on.

As shown in FIG. 3 or 4, the power source unit cooling section 61 is disposed in a space between a block composed of the light source device 411 and the power supply unit 5 and the back face sections 21D, 22D of the exterior chassis 2. As shown in FIG. 3 or 4, the power supply unit cooling section 61 is provided with an air inlet duct 611, a sirocco fan 612, and a first air outlet duct 613. And, the power supply unit cooling section 61 drives the sirocco fan 612 to lead the cooling air outside the projector 1 to the inside of the box-like members 511, 521 along an air flow path connecting the air inlet (not shown) provided to the lower case 22, the air inlet duct 611, the sirocco fan 612, and the air outlet duct 613, and via each of the inlets 511A, 521A of the respective box-like members 511, 521 forming the power supply unit 5. The air led inside the box-like member 521 of the power supply unit 5 is led inside the box-like member 511 through the outlet (not shown) of the box-like member 521 and the second inlet of the box-like member 511 (not shown). In the inside of the box-like member 521, the circuit board for the lamp drive block 52 is cooled while the air flows from the inlet 521A to the outlet. Further, the air led inside the box-like member 511 of the power supply unit 5 is discharged to an area surrounded by the substantially L-shaped block composed of the box-like member 511 and the light source device 411 through the outlet 511B. In the inside of the box-like member 511, the circuit board for the power source block 51 is cooled while the air flows from the first inlet 511A and the second inlet to the outlet 511B.

As shown in FIG. 3 or 4, the light source device cooling section 62 is disposed in an area surrounded by the substantially L-shaped block composed of the light source device 411 and the box-like member 511. As shown in FIG. 3 or 4, the light source cooling section 62 is provided with an axial fan 621 and a second air outlet duct 622. And, the light source device cooling section 62 drives the axial fan 621 to discharge the air (the air discharged through the power supply unit 5) in the space surrounded with the substantially L-shaped block composed of the light source device 411 and the box-like member 511 and the air in other spaces to the outside of the projector 1 in a direction receding from the projection direction of the projection lens 3 along an air flow path connecting the axial fan 621 and the second air outlet duct 622 and via the air outlet 233 of the front case 23. More specifically, as shown in FIG. 3 or 4, the lamp housing 411C forming the light source device 411 is provided with a plurality of openings 411C1 allowing the air to circulate between inside and outside thereof formed in each of the end faces facing in the anteroposterior direction, and when the axial fan 621 is driven, the inside air of the lamp housing 411C is sucked in by the axial fan 621 through the plurality of openings 411C1. In the lamp housing 411C, while the air circulates through the plurality of openings 411C1, the light source lamp 411A and the reflector 411B are cooled.

6. Configuration of Projection Position Adjusting Device 8

Figure 6:
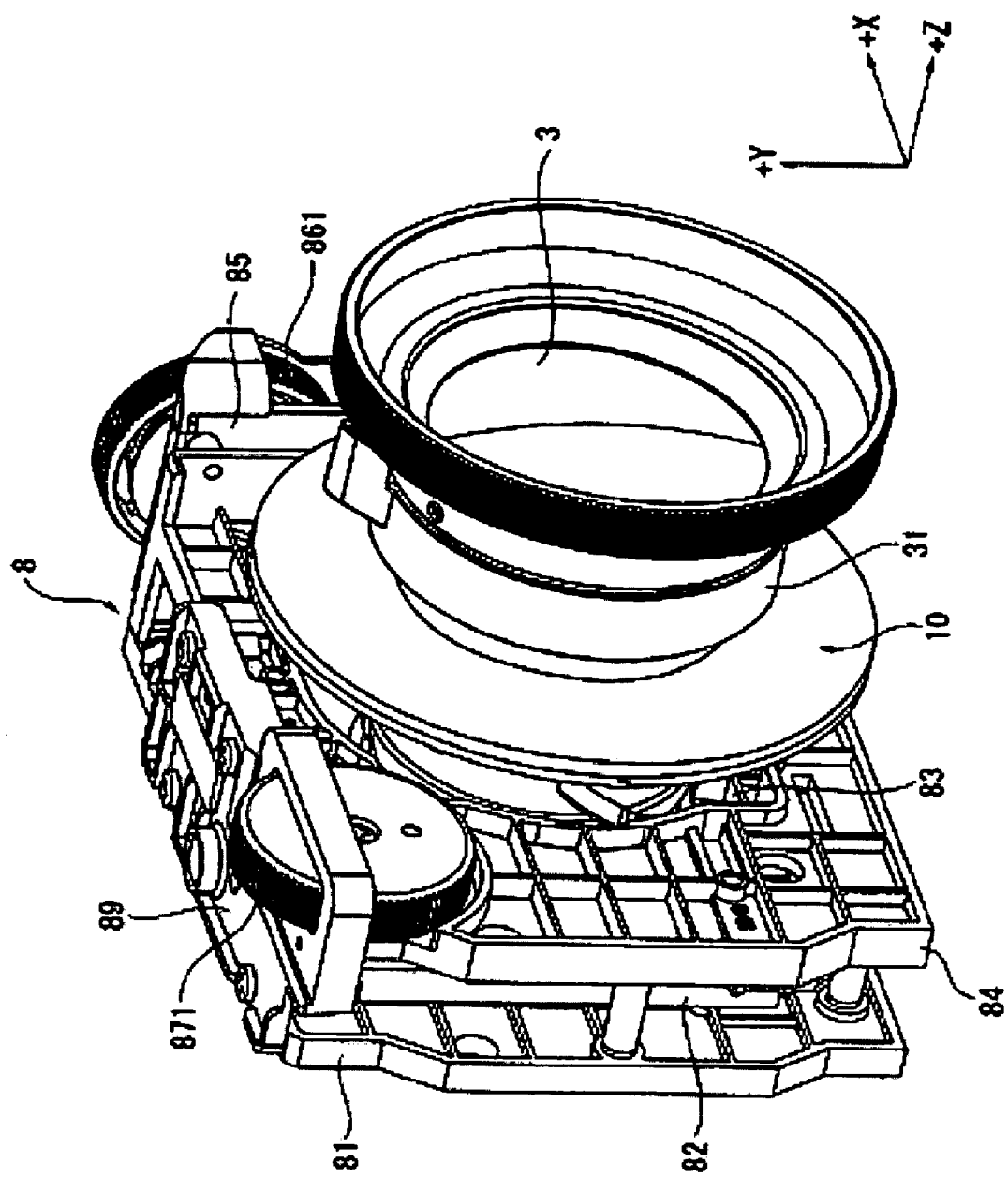
FIG. 6 is a perspective view of a projection position adjusting device according to the embodiment viewed from a front side thereof in the projection direction.
Figure 8:
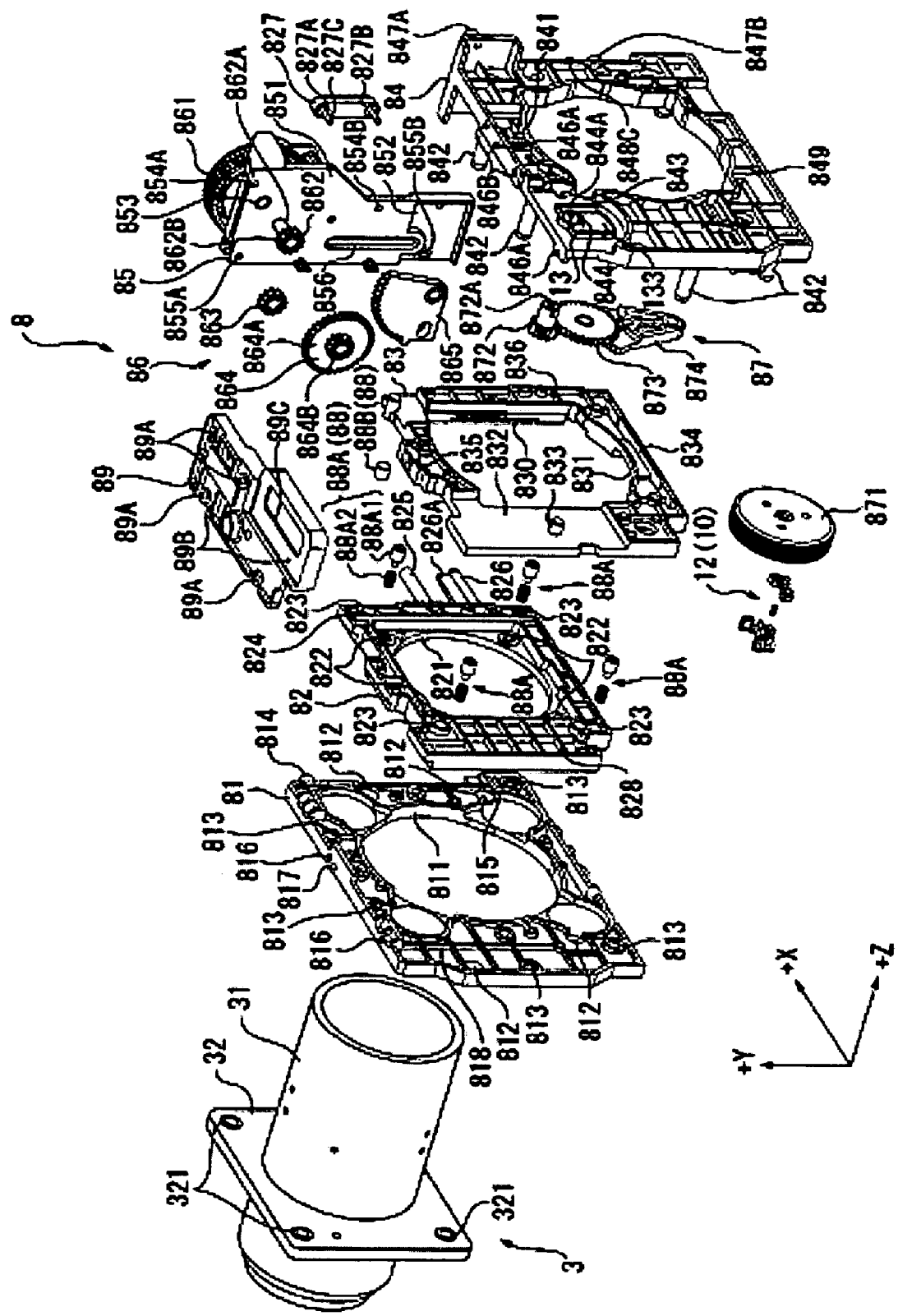
FIG. 8 is an exploded perspective view of the projection position adjusting device according to the embodiment.

FIGS. 6 through 8 are views for showing the structure of the projection position adjusting device 8. Specifically, FIG. 6 is a perspective view of the projection position adjusting device 8 viewed from the back side thereof in the optical path, FIG. 7 is a perspective view thereof viewed from the front side in the optical path, and FIG. 8 is an exploded perspective view of the projection position adjusting device 8.

It should be noted that, in FIGS. 6 through 8, it is assumed that the projection direction of the projection lens 3 is denoted as Z-axis and two axes perpendicular to the Z-axis are denoted as X-axis (horizontal axis) and Y-axis (vertical axis) for the sake of explanation.

6-1. Configuration of Projection Position Adjusting Device 8

The projection position adjusting device 8 is for adjusting the projection position of the projection lens 3. As shown in FIG. 8, the projection position adjusting device 8 is provided with a fixed plate 81, a first moving plate 82, a second moving plate 83, an auxiliary plate 84, a supporting plate 85, a first adjusting drive section 86, a second adjusting drive section 87, a biasing member 88, and a shift cover 89.

It should be noted that among these components, the auxiliary plate 84 and the supporting plate 85 correspond to a fixed member of the invention, the first moving plate 82 and the second moving plate 83 correspond to a moving member of the invention, and the first adjusting drive section 86 and the second adjusting drive section 87 correspond to a drive mechanism of the invention.

The fixed plate 81 is fixed to the optical component chassis 45 (see FIG. 5), and supports the whole of the projection position adjusting device 8. The fixed plate 81 has a substantially rectangular shape in the plan view as shown in FIG. 8.

The fixed plate 81 is provided with an opening section 811 having a substantially circular shape in the plan view formed at substantially the center section thereof for allowing the body tube 31 of the projection lens 3 to be inserted.

And, it is arranged that the first moving plate 82 slides on the periphery section of the opening section 811 in the end face in the +Z-axis direction of the fixed plate 81.

The fixed plate 81 is provided with four fixing holes 812 formed surrounding the opening section 811. And, screws (not shown) are installed in screw holes (not shown) provided to the side face of the optical component chassis 45 via the fixing holes 812, thereby fixing the fixed plate 81 to the optical component chassis 45.

Further, in the fixed plate 81, on the periphery of the end face of the fixed plate 81 perpendicular to the Z-axis direction, five fixing holes 813 penetrate in the Z-axis direction as shown in FIG. 8. Screws (not shown) are inserted to the fixing holes 813, and the screws are installed in the fixing tubes 842 of the auxiliary plate 84 described later, thereby connecting the fixed plate 81 and the auxiliary plate 84 to each other.

In the fixed plate 81, on the +Y-axis direction end side (upper end side) of the +X-axis direction end face, there is formed a fixing tube 814 protruding towards the +X-axis direction. The fixing tube 814 is provided with a threaded hole from the +X-axis direction end face to the −X-axis direction.

Further, in the fixed plate 81, on the −Y-axis direction end side (lower end side) of the +X-axis direction end face, there is formed a threaded hole 815 towards the −X-axis direction.

And, in the fixed plate 81, on the +Y-axis direction end face (upper end face), there are formed two threaded holes 816 and a locating lug 817 for fixing the shift cover 89 as shown in FIG. 8.

Further, in the fixed plate 81, on the +Z-axis direction end face, there is erected a plurality of strengthening ribs 818 as shown in FIG. 8. By providing such strengthening ribs 818, influence of the external force to the projection position adjusting device 8 can be eased, thus preventing the projection position from being shifted by the external force.

The first moving plate 82 has a substantially rectangular shape in the plan view smaller than the fixed plate 81, and is disposed in the +Z-axis side of the fixed plate 81 as shown in FIGS. 6 and 8. As shown in FIG. 8, the first moving plate 82 is configured to abut on the periphery section of the opening section 811 on the +Z-axis direction end face in the fixed plate 81, and to be movable in the Y-axis direction and the X-axis direction. Further, the first moving plate 82 fixedly supports the projection lens 3 and moves, thereby moving the projection lens 3 in the Y-axis direction and the X-axis direction.

In the first moving plate 82, at substantially the center section thereof, there is formed an opening section 821 capable of inserting the body tube 31 of the projection lens 3 as shown in FIG. 8.

The opening section 821 is formed to have a diameter approximated to the outside diameter of the body tube 31 in order for reducing the gap with the outer periphery of the body tube 31. By thus forming the opening section 821, it can be prevented that the light leaks from the gap between the body tube 31 and the opening section 821, and that dusts enter inside the projector 1.

In the first moving plate 82, at four corners in the periphery of the opening section 821, there are formed fixing holes 822 corresponding to fixing holes 321 in a flange 32 of the projection lens 3 as shown in FIG. 8. And, screws (not shown) are installed in the fixing holes 822 from the +Z-axis direction (the inverse direction of the projection direction) through the fixing holes 321 in the flange section 32 in the condition in which the body tube 31 of the projection lens 3 is inserted in the opening section 821, thereby fixing the projection lens 3 to the first moving plate 82. Namely, the first moving plate 82 fixedly supports the projection lens 3 on the surface facing the fixed plate 81.

Further, in the first moving plate 82, at four corners on the +Z-axis direction end face, there are formed biasing holes 823 as shown in FIG. 8. And, these biasing holes 823 are each provided with a biasing member 88 described later.

And, in the first moving plate 82, in the +X-axis direction end section side of the +Z-axis direction end face, there is formed a rail groove 824 hollowing in the −Z-axis direction and extending along the Y-axis direction as shown in FIG. 8.

Further, in the first moving plate 82, in substantially the center section in the Y-axis direction of the +X-axis direction end face, there are formed moving lugs 825, 826 so as to protrude in the +X-axis direction as shown in FIG. 8.

The moving lugs 825, 826 are both inserted in a tracking slit 856 in the supporting plate 85 both described later. Among the above, the moving lug 825 is engaged with a drive gear of the first adjusting drive section 86 described later in the −X-axis direction side of the supporting plate 85 to absorb the force of the drive gear. These moving lugs 825, 826 are each provided with a threaded hole (not shown) from the +X-axis direction end face to the −X-axis direction.

It should be noted that on the +Y-axis direction side of the moving lug 826, there is formed a reinforcing plate 826A protruding from the +X-axis direction end face of the first moving plate 82 along the moving lug 826. The reinforcing plate 826A is formed to be integrated with the moving lug 826 in the −Y-axis direction end section thereof.

The moving lugs 825, 826 are provided with a bridge member 827 described later bridged therebetween on the +X-axis direction end face thereof as shown in FIG. 8.

The bridge member 827 is an elongated member extending in the Y-axis direction, and is provided with fixing holes 827A, 827B formed on both end sections (upper and lower ends) in the Y-axis direction, respectively, so as to penetrate the bridge member 827 in the X-axis direction. The distance between the fixing holes 827A, 827B in the Y-axis direction corresponds with the distance between the moving lugs 825, 826 in the Y-axis direction.

And, by screws 827C installed in screw holes of the moving lugs 825, 826 via the fixing holes 827A, 827B of the bridge member, the bridge member 827 is bonded with the +X-axis direction end face of the moving lugs 825, 826.

By forming and bonding the moving lug 826 and the bridge member 827, the strength in the Y-axis direction of the moving lug 825 can be reinforced. Namely, since the force from the drive gear acts on the moving lug 825, it might be apt to be broken in the Y-axis direction. However, since the moving lug 826 is formed at the −Y-axis side of the moving lug 825, and further, the bridge member 827 is bridged between the moving lugs 825, 826 in the Y-axis direction, the force applied to the moving lug 825 can be dispersed to the moving lug 826 and the bridge member 827. Further more, since the reinforcing plate 826A is provided to the moving lug 826, the moving lug 826 can be made hard to be broken, thus further reinforcing the moving lug 825.

Further, the first moving plate 82 is moved together with the second moving plate 83 in the X-axis direction. The moving lugs 825, 826 and the reinforcing plate 826A have enough lengths in the X-axis direction so that the first moving plate 82 can move in the −X-axis direction as far as possible with respect to the supporting plate 81.

In the first moving plate 82, on the +Z-axis direction end face, there is erected a plurality of strengthening ribs 828 as shown in FIG. 8. By providing such strengthening ribs 828, influence of the external force to the projection position adjusting device 8 can be eased, thus preventing the projection position from being shifted by the external force.

The second moving plate 83 has a similar shape to the first moving plate 82, and disposed at the +Z-axis direction side of the first moving plate 82 as shown in FIG. 8. The second moving plate 83 is configured to be movable in the X-axis direction, and moves the first moving plate 82 in the X-axis direction while engaging with the first moving plate 82.

In the second moving plate 83, on the −Z-axis direction end face there is formed a sliding projection 830 extending along the Y-axis direction in a position corresponding to the rail groove 824 of the first moving plate 82. The sliding projection 830 is engaged with the rail groove 824 of the first moving plate 82 in a condition in which the projection position adjusting device 8 is completed. Thus, the first moving plate 82 is guided by the rail groove 824 and the sliding projection 830 to be moved in the Y-axis direction with respect to the second moving plate 83. Further, the first moving plate 82 is moved in the X-axis direction in conjunction with the movement of the second moving plate 83 in the X-axis direction with the help of the rail groove 824 and the sliding projection 830.

In the second moving plate 83, at substantially the center section thereof, there is formed an opening section 831 capable of inserting the body tube 31 of the projection lens 3 as shown in FIG. 8.

The opening section 831 has a shape greater than the outer periphery of the body tube 31 in diameter so that the outer periphery of the body tube 31 and the inner periphery of the opening section 831 do not mechanically interfere with each other when the first moving plate 82 moves with respect to the second moving plate 83 to move the projection lens 3.

Further, in the second moving plate 83, on a corner portion of +Y-axis direction side (upper direction) of the +Z-axis direction end face, there is formed a recessed section 832 hollowing towards the −Z-axis direction as shown in FIG. 8. And, the recessed section 832 is provided with a dial gear, an intermediate gear, and a drive gear configuring the second adjusting drive section 87 disposed respectively. And, the recessed section 832 is provided with a moving lug 833 protruding in the +Z-axis direction and engaging with the drive gear to absorb the force from the drive gear as shown in FIG. 8.

Further more, in the second moving plate 83, in the −Y-axis direction end section side of the +Z-axis direction end face, there is formed an engaging projection 834 protruding in the +Z-axis direction and extending along the X-axis direction and engaging with the auxiliary plate 84 as shown in FIG. 8.

Further, in the second moving plate 83, at substantially the center section in the X-axis direction of the +Y-axis direction end section (upper end section), there is formed a recessed section 835 having a substantially hemicycle cross-sectional shape in the X-Y plane as shown in FIG. 8. And, the recessed section 835 is provided with the biasing members 88 described later.

In the second moving plate 83, on the +Z-axis direction end face except the recessed section 832, there is erected a plurality of strengthening ribs 836 as shown in FIG. 8. By providing such strengthening ribs 836, influence of the external force to the projection position adjusting device 8 can be eased, thus preventing the projection position from being shifted by the external force.

The auxiliary plate 84 has a similar shape to the fixed plate 81, and is disposed at the +Z-axis direction side of the second moving plate 83 to hold the first moving plate 82 and the second moving plate 83 with the fixed plate 81 therebetween as shown in FIG. 8.

In the auxiliary plate 84, at substantially the center section thereof, there is formed an opening section 841 capable of inserting the body tube 31 of the projection lens 3 as shown in FIG. 8.

The opening section 841 has a shape greater than the periphery shape of the body tube 31 in size so that the outer periphery of the body tube 31 and the inner periphery of the opening section 841 do not mechanically interfere with each other when the projection lens 3 moves.

In the auxiliary plate 84, in the −Z-axis direction end face, there are formed five fixing tubes 842 for connecting to the fixed plate 81 and protruding in the −Z-axis direction corresponding to the positions of the five fixing holes 813 of the fixed plate 81 as shown in FIG. 8.

These fixing tubes 842 are provided with threaded holes formed inside thereof towards +Z-axis direction. And, screws are installed in the threaded holes of the fixing tubes 842 via the fixing holes 813 in the condition in which the fixing tubes 842 abut on the fixing holes 813 of the fixed plate 81, thus the auxiliary plate 84 is fixed to the fixed plate 81.

Further, in the auxiliary plate 84, on a corner portion in the −X-axis direction side and +Y-axis direction side (upper direction) of the +Z-axis direction end face, there is formed a recessed section 843 hollowing towards the −Z-axis direction as shown in FIG. 8. And, on the recessed section 843, there is disposed a dial knob 871 forming the second adjusting drive section 87.

Further, in the recessed section 843, there is formed a pivot section 844 protruding towards the +Z direction and provided with an insertion hole 844A formed therein as shown in FIG. 8. And, a rotating shaft of a dial gear forming the second adjusting drive section 87 is inserted in the insertion hole 844A, thus the pivot section 844 rotatably supports the dial knob 871 and the dial gear.

On the back face (−Z-axis direction end face) of the recessed section 843, there is formed a rotational shaft 845A (see FIG. 10) rotatably supporting the intermediate gear of the second adjusting drive section 87. Further, on the −Z-axis direction end face, there is formed a rotational shaft 845B (see FIG. 10) for rotatably supporting the drive gear of the second adjusting drive section 87 at the −Y-axis direction side (lower side) of the rotational shaft 845A.

In the auxiliary plate 84, on the +Y-axis direction end section (upper end section) there are formed two locating lugs 846A for positioning the shift cover 89 and two threaded holes 846B for fixing the shift cover 89 as shown in FIG. 8.

Further, in the auxiliary plate 84, on the +X-axis direction end face, there are formed fixing tubes 847A, 847B (see FIG. 10) for fixing the supporting plate 85, and rotational shafts 848A, 848B, 848C (see FIGS. 9 and 10) for rotatably supporting a dial gear, a second intermediate gear and a drive gear of the first adjusting drive section 86, respectively. It should be noted that the fixing tubes 847A, 847B are provided with threaded holes formed towards the −X-axis direction.

Further, in the auxiliary plate 84, on the +Z-axis direction end face, there is erected a plurality of strengthening ribs 849 as shown in FIGS. 6 through 8. By providing such strengthening ribs 849, influence of the external force to the projection position adjusting device 8 can be eased, thus preventing the projection position from being shifted by the external force.

In the auxiliary plate 84, on the −Z-axis direction end face, there is formed an engaging recessed section 840 (see FIG. 10) extending along the X-axis direction at a position corresponding to the engaging projection 834 of the second moving plate 83. The engaging recessed section 840 is formed to have a length greater than a total of the length in the X-axis direction of the engaging projection 834 and the moving distance in the X-axis direction of the second moving plate 83. In the condition in which the projection position adjusting device 8 is completed, the engaging projection 834 of the second moving plate 83 is inserted in the engaging recessed section 840 of the auxiliary plate 84. And, the second moving plate 83 is moved in the X-axis direction with respect to the auxiliary plate 84 while being guided by the engaging projection 834 and the engaging recessed section 840.

The supporting plate 85 is disposed at the +X-axis direction of the fixed plate 81, the first moving plate 82, the second moving plate 83, and the auxiliary plate 84 as shown in FIGS. 6 through 8, and supports the first adjusting drive section 86, and reinforces the connection state between the fixed plate 81 and the auxiliary plate 84.

In the supporting plate 85, a portion 852 in the −Y-axis direction side (lower side) is bulged out from a portion 851 in the +Y-axis direction side (upper side) in the +X-axis direction as shown in FIG. 8.

In the supporting plate 85, at the +Y-axis direction side (upper side) of the portion 851 there is formed a pivot section 853 penetrating from the front to the back as shown in FIG. 8. And, a shaft portion of a dial gear forming the first adjusting drive section 86 is inserted in the pivot section 853, and the dial knob 861 and the dial gear are rotatably supported by the pivot section 853.

Further, in the supporting plate 85, a corner section at the +Y-axis direction side (upper side) of the portion 851 and on the +Z-axis direction side, and a portion at the −Y-axis direction side (lower side) of the portion 851 and on the +Z-axis direction side, there are formed fixing holes 854A, 854B.

By screws installed in the threaded holes of the fixing tubes 847A, 847B of the auxiliary plate 84 via the fixing holes 854A, 854B, the supporting plate 85 is fixed to the auxiliary plate 84.

Further, in the supporting plate 85, in the portion 851, there are formed fixing holes 855A, 855B in the positions corresponding to the fixing tube 814 and the fixing threaded hole 815 of the fixed plate 81, respectively, as shown in FIG. 8. And, screws are installed in the fixing tube 814 and the fixing threaded hole 815 of the fixed plate 81 through the fixing holes 855A, 855B, thus the supporting plate 85 is fixed to the fixed plate 81.

And, in the supporting plate 85, as shown in FIG. 8, there is formed the tracking slit 856 from the portion 851 to the portion 852 at a position corresponding to the moving lugs 825, 826 of the first moving plate 82. The tracking slit 856 is formed so as to extend in the Y-axis direction as shown in FIG. 8.

In the condition in which the projection position adjusting device 8 is completed, the moving lugs 825, 826 are inserted in the tracking slit 856, it is prevented that the moving lugs 825, 826 mechanically interfere with the supporting plate 85 in accordance with the movement of the first moving plate 82.

Figure 9:
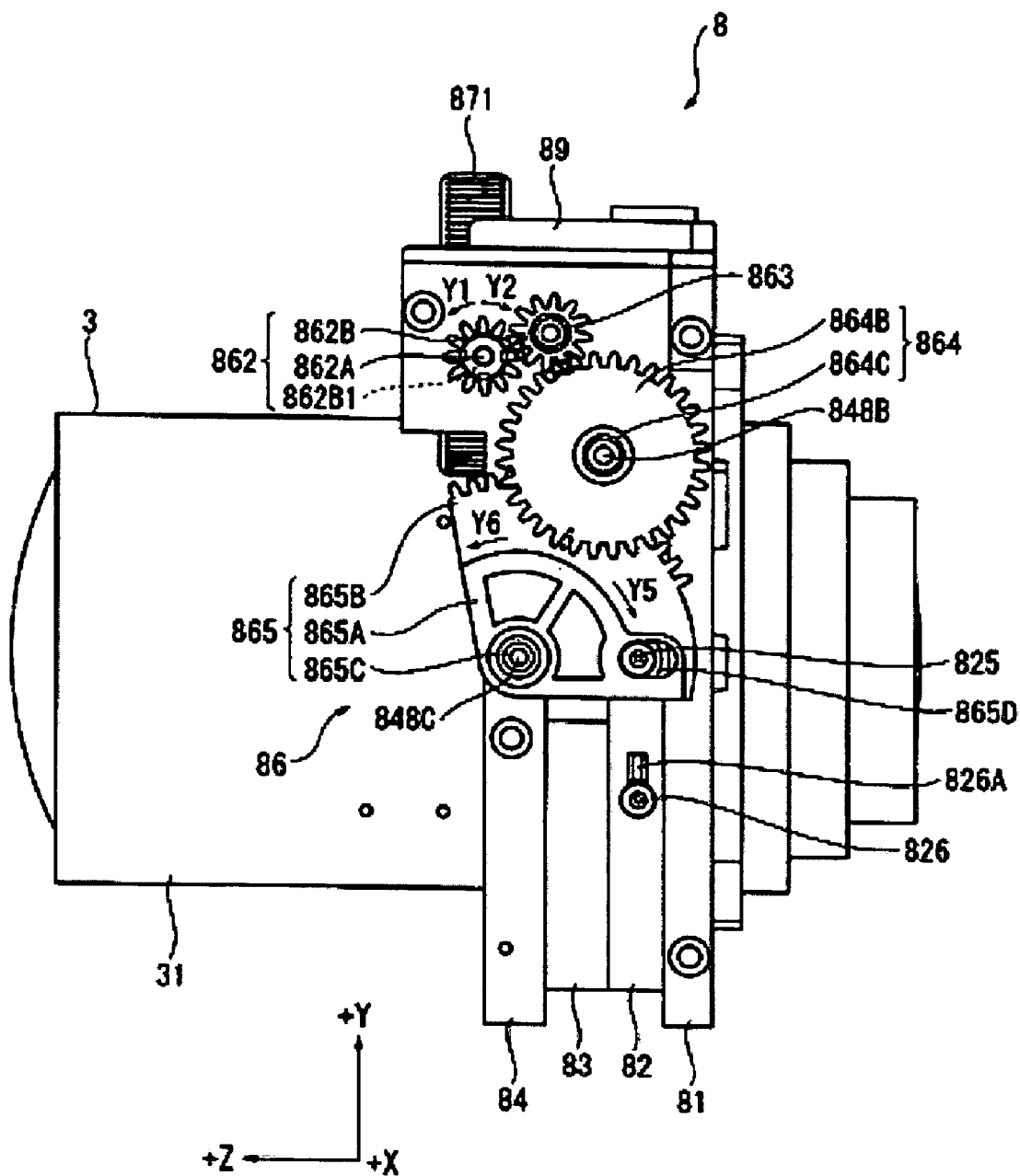
FIG. 9 is a view showing the structure of a first adjusting drive section according to the embodiment.

FIG. 9 is a view showing the structure of the first adjusting drive section 86. Specifically, FIG. 9 is a view of the condition with the supporting plate 85 removed from the projection position adjusting device 8 viewed from the +X-axis direction. It should be noted that, in FIG. 9, similarly to FIGS. 6 through 8, it is assumed that the projection direction of the projection lens 3 is denoted as Z-axis and two axes perpendicular to the Z-axis are denoted as X-axis (horizontal axis) and Y-axis (vertical axis).

The first adjusting drive section 86 is for moving the first moving plate 82 in the Y-axis direction in accordance with an operation of a user, thereby changing the projection position of the projector lens 3 in the Y-axis direction. The first adjusting drive section 86 is provided with the dial knob 861 (see FIG. 8), the dial gear 862, the first intermediate gear 863, a second intermediate gear 864, and the drive gear 865 as shown in FIG. 8 or 9.

The dial knob 861 is a operation section partially exposed from the top face of the upper case 21 of the exterior chassis 2, and operated by the user. The dial knob 861 has a substantially cylindrical shape as shown in FIG. 8, and is formed like a lid having a space inside thereof and disposed at the +X-axis side of the supporting plate 85. At the center section of the dial knob 861, there is formed a fixing hole.

The dial gear 862 is for engaging with the dial knob 861, rotating together with the dial knob 861, and transmitting the rotation to the first intermediate gear 863, and is disposed at the −X-axis direction side of the supporting plate 85 as shown in FIG. 8. The dial gear 862 is composed of a shaft section 862A and a gear 862B as shown in FIG. 8 or 9.

The shaft section 862A has a cylindrical shape, and provided with a threaded hole (not shown) formed from the tip face towards the gear 862A side. A screw is installed in the threaded hole of the shaft section 862A through the center hole of the dial knob 861 and the pivot section 853 of the supporting plate 85 from the +X-axis direction, thus the dial knob 861 is pivotally supported by the supporting plate 85.

The gear 862 B is connected to a proximal end portion of the shaft section 862A, and meshes with the first intermediate gear 863 to transmit the rotation of the dial knob 861 to the first intermediate gear 863. As shown in FIG. 9, at the rotational center of the gear 862B, there is formed a circular hole 862B1, and in the condition in which the projection position adjusting device 8 is completed, the rotational shaft 848A of the auxiliary plate 84 is inserted in the circular hole 862B1, thus the dial gear 862 is rotatably supported by the rotational shaft 848A.

The first intermediate gear 863 meshes with the gear 862B of the dial gear 862 and the gear 864A of the second intermediate gear 864, and is disposed on the −X-axis direction side of the supporting plate 85. The first intermediate gear 863 transmits the rotation of the dial gear 862 to the second intermediate gear 864.

The second intermediate gear 864 is configured, as shown in FIG. 8, to have a first gear wheel 864A with larger diameter and a second gear wheel 864B with smaller diameter integrated with each other, and is disposed on the −X-axis direction side of the supporting plate 85.

The first gear wheel 864A is for meshing with the first intermediate gear 863.

The second gear wheel 864B is for meshing with the engaging section of the drive gear 865, and transmits the rotation of the first intermediate gear 863 to the drive gear 865 in cooperation with the first gear wheel 864A. And, as shown in FIG. 9, at the rotational center of the second intermediate gear 864, there is formed a circular hole 864C, and in the condition in which the projection position adjusting device 8 is completed, the rotational shaft 848B of the auxiliary plate 84 is inserted in the circular hole 864C, thus the second intermediate gear 864 is rotatably supported by the rotational shaft 848B.

The drive gear 865 has a sector form in the plan view, as shown in FIG. 8 or 9, and is disposed on the −X-axis direction side of the supporting plate 85. The drive gear 865 is composed of a gear main body 865A and a meshing section 865B as shown in FIG. 9.

The gear body 865A is a section to be rotatably supported by the rotational shaft 848C of the auxiliary plate 84, and is provided with a circular hole 865C, to which the rotational shaft 848C can be inserted, formed in a proximal end section thereof.

Further, the gear main body 865A is provided with a tracking slit 865D formed extending in a direction radially expanding from the center position of the circular hole 865C. And, in the condition in which the projection position adjusting device 8 is completed, the moving lug 825 of the first moving plate 82 is inserted in the tracking slit 865D.

The meshing section 865B is formed in an arc section on the tip portion of the gear main body 865A, and meshes with the second gear wheel 864B of the second intermediate gear 864.

According to the configuration as described above, when a user turns the dial knob 861 in the Y1 direction (see FIG. 9), the rotation of the dial knob 861 is transmitted to the drive gear 865 via the dial gear 862, the first intermediate gear 863, and the second intermediate gear 864, and the drive gear 865 then rotates in the Y5 (see FIG. 9) direction around the rotational shaft 848C.

In this case, the moving lug 825 is guided by the tracking slit 865D, and the first moving plate 82 is moved in the −Y-axis direction (downward). And, the projection lens 3 is moved in the −Y-axis direction (downward) in conjunction with the first moving plate 82, thus the projection position is adjusted in the −Y-axis direction (downward).

Further, when a user turns the dial knob 861 in the Y2 direction (see FIG. 9), contrary to the above, the drive gear 865 rotates in the Y6 direction (see FIG. 9) around the rotational shaft 848C. In this case, the moving lug 825 is guided by the tracking slit 865D, and the first moving plate 82 is moved in the +Y-axis direction (upward), thus the projection position is adjusted in the +Y-axis direction (upward).

Figure 10:
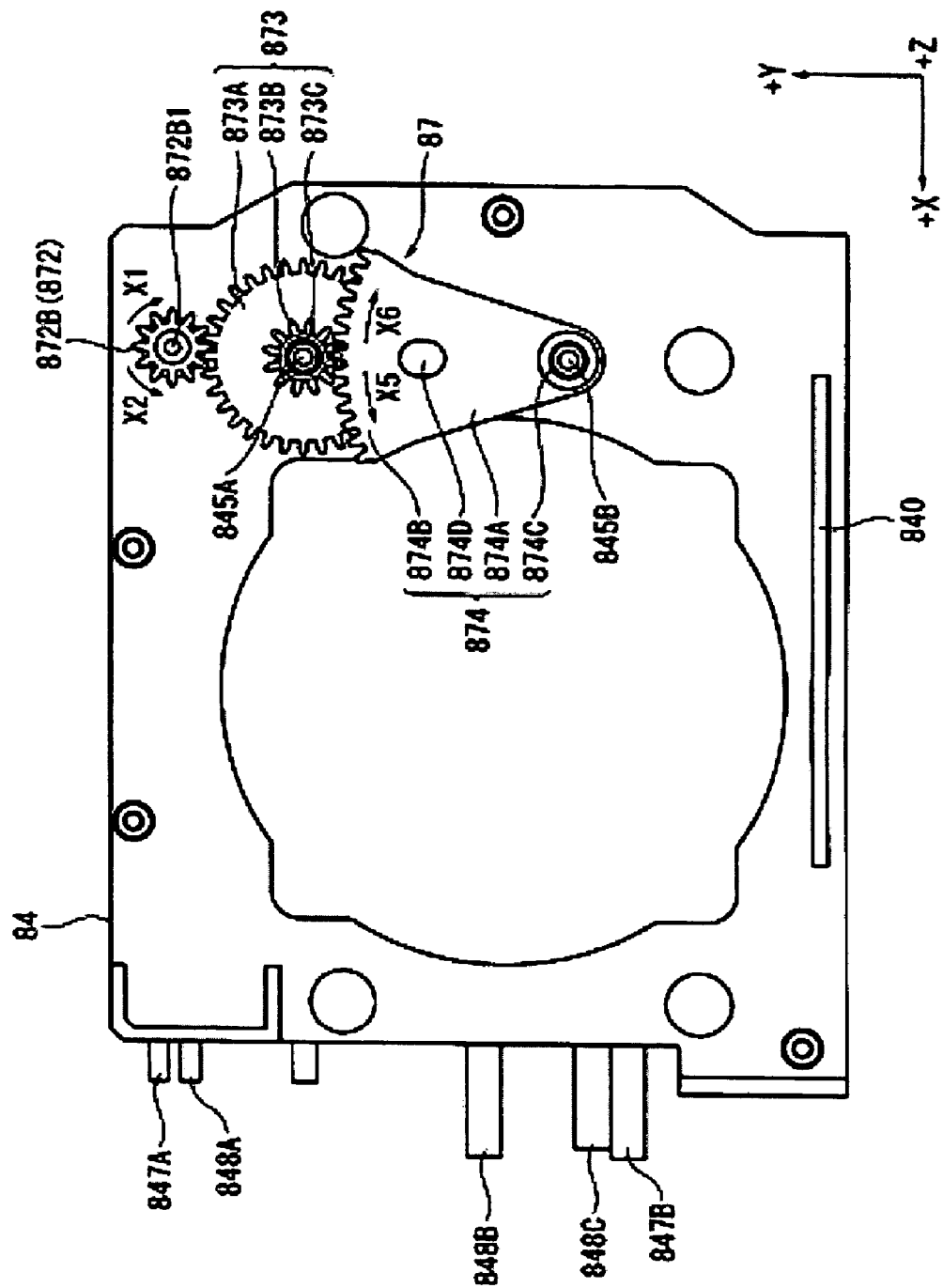
FIG. 10 is a view showing the structure of a second adjusting drive section according to the embodiment.

FIG. 10 is a view showing the structure of the second adjusting drive section 87. Specifically, FIG. 10 is a view of a condition of the second adjusting drive section 87 disposed on the auxiliary plate 84 viewed from the −Z-axis direction. It should be noted that, in FIG. 10, similarly to FIGS. 6 through 8, it is assumed that the projection direction of the projection lens 3 is denoted as Z-axis and two axes perpendicular to the Z-axis are denoted as X-axis (horizontal axis) and Y-axis (vertical axis).

In the second adjusting drive section 87, the second moving plate 83 is moved in the X-axis direction by an operation of a user, the first moving plate 82 is moved in conjunction with the movement of the second moving plate 83, thus the projection position of the projection lens 3 is changed in the X-axis direction. The second adjusting drive section 87 is provided with the dial knob 871 (including a hole 871A (see FIG. 13)), a dial gear 872 (including a shaft section 872A, a gear 872B, and a circular hole 872B1), an intermediate gear 873 (including a first gear wheel 873A, a second gear wheel 873B, and a circular hole 873C), and a drive gear 874 (including a gear main body 874A, a meshing section 874B, a circular hole 874C, and a tracking slit 874D), respectively similar to the dial knob 861 (including the hole in the reverse side), the dial gear 862 (including the shaft section 862A, the gear 862B, and the circular hole 862B1), the second intermediate gear 864 (including the first gear wheel 864A, the second gear wheel 864B, and the circular hole 864C), and the drive gear 865 (including a gear main body 865A, a meshing section 865B, a circular hole 865C, and a tracking slit 865D) of the first adjusting drive section 86, respectively.

The dial knob 871 is partially exposed from the top face of the upper case 21 of the exterior chassis 2, and is a operating section operated by a user, and disposed on the +Z-axis direction side of the auxiliary plate 84 in the recessed section 843 of the auxiliary plate 84 as shown in FIG. 8.

The dial gear 872 is, as shown in FIG. 8, disposed on the −Z-axis direction side of the auxiliary plate 84. And, as shown in FIG. 8, the dial gear 872 has the shaft section 872A inserted in the insertion hole 844A of the auxiliary plate 84 in the condition in which the projection position adjusting device 8 is completed. And, the threaded hole of the shaft section 872A and the hole 871A (see FIG. 13) in the reverse side of the dial knob 871 are fixed with a screw, thus the dial knob 871 is rotationally supported by the auxiliary plate 84.

The intermediate gear 873 is, as shown in FIG. 10, disposed on the −Z-axis direction side of the auxiliary plate 84. And, as shown in FIG. 10, in the condition in which the projection position adjusting device 8 is completed, the rotational shaft 845A of the auxiliary plate 84 is inserted in the circular hole 873C of the intermediate gear 873, thus the intermediate gear 873 is rotatably supported by the rotational shaft 845A.

The drive gear 874 is, as shown in FIG. 8, disposed on the −Z-axis direction side of the auxiliary plate 84. And, as shown in FIG. 10, in the condition in which the projection position adjusting device 8 is completed, the rotational shaft 845B of the auxiliary plate 84 is inserted in the circular hole 874C of the drive gear 874, thus the drive gear 874 is rotatably supported by the rotational shaft 845B. Further, in the condition in which the projection position adjusting device 8 is completed, the moving lug 833 of the second moving plate 83 is inserted in the tracking slit 874D of the drive gear 874.

According to the configuration as described above, when a user turns the dial knob 871 in the X1 direction (see FIG. 10), the rotation of the dial knob 871 is transmitted to the drive gear 874 via the dial gear 872 and the intermediate gear 873, and the drive gear 874 then rotates in the X5 (see FIG. 10) direction around the rotational shaft 845B. In this case, the moving lug 833 is guided by the tracking slit 874D, and the second moving plate 83 is moved in the −X-axis direction. In this case, the first moving plate 82 is moved in the −X-axis direction in conjunction with the second moving plate 83 with the help of the sliding projection 830 of the second moving plate 83 and the rail groove 824 of the first moving plate 82. And, the projection lens 3 is moved in the −X-axis direction in conjunction with the first moving plate 82, thus the projection position is adjusted in the −X-axis direction.

Further, when a user turns the dial knob 871 in the X2 direction (see FIG. 10), contrary to the above, the drive gear 874 rotates in the X6 direction (see FIG. 10) around the rotational shaft 845B. In this case, the moving lug 833 is guided by the tracking slit 874D, and the second moving plate 83 and the first moving plate 82 are moved in the +X-axis direction, thus the projection position is adjusted in the +X-axis direction.

As shown in FIGS. 6 through 8, the shift cover 89 is disposed on the +Y-axis direction end section side (upper end side) of the projection position adjusting device 8 and at the +Y-axis direction side (upper side) of the projection lens 3.

The shift cover 89 is a part to be fixed to the fixed plate 81 and the auxiliary plate 84, and is composed of a plate member with a rectangular shape in the plan view.

The shift cover 89 is provided with four fixing holes 89A each formed corresponding to respective one of the two threaded holes 816 of the fixed plate 81 and two threaded holes 846B of the auxiliary plate 84 as shown in FIG. 8. Further, there are formed three locating holes 89B in accordance with the locating lug 817 of the fixed plate 81 and the two locating lugs 846A of the auxiliary plate 84.

And, by inserting the locating lugs 817, 846A in the three locating holes 89B, respectively, the shift cover 89 is positioned with respect to the members 81 through 84. And, by installing screws (not shown) in the threaded holes 816, 846B of the fixed plate 81 and the auxiliary plate 84 through the four fixing holes 89A, the shift cover 89 is fixed to the members 81 through 84.

Further, the shift cover 89 is provided with an opening section 89C formed in accordance with the dial knob 871 of the second adjusting drive section 87 as shown in FIG. 8. Namely, it is arranged that a part of the dial knob 871 is exposed through the opening section 89C in the condition in which the shift cover 89 is fixed to the members 81 through 84.

The biasing member 88 is composed of four first biasing members 88A disposed between the first moving plate 82 and the second moving plate 83 and a second biasing member 88B disposed between the second moving plate 83 and the shift cover 89 as shown in FIG. 8.

The four first biasing members 88A are each composed of a stopper 88A1 and a spring 88A2. And, as shown in FIG. 8, the spring 88A2 is inserted in each of four biasing holes 823 of the first moving plate 82 from the +Z-axis direction, and further the stopper 88A1 is then fitted therein via the spring 88A2 thus inserted. Therefore, the biasing force in the Z-axis direction acts on the stopper 88A1.

Accordingly, in the condition in which the projection position adjusting device 8 is completed, these first biasing members 88A bias the first moving plate 82 against the fixed plate 81 while biasing the second moving plate 83 against the auxiliary plate 84.

Thus, the second moving plate 83 can be biased with respect to the first moving plate 82 and the auxiliary plate 84 in the condition in which the projection position adjusting device 8 is completed. Therefore, the gaps between the second moving plate 83 and both of the first moving plate 82 and the auxiliary plate 84 caused by the manufacturing tolerances can be eliminated by the first biasing members 88A, thus it becomes possible to preferably move the second moving plate 83 without any jerky movements when moving the second moving plate 83 in the X-axis direction. Further, by thus providing the first biasing members 88A therebetween, the first moving plate 82 is also biased against the fixed plate 81, thus the first moving plate 82 can also be moved preferably with respect to the fixed plate 81. Therefore, surging motion of the projection position can be eliminated when moving the moving plates 82, 83 to adjust the projection position, thus the projection position can be adjusted with further accuracy.

The second biasing member 88B is a molding with a cylindrical shape, as shown in FIG. 8, formed from a resin material using a molding process. And, the second biasing member 88B is disposed in the recessed section 835 of the second moving plate 83 so that the cylindrical axis is set towards the Z-axis direction. And, in the condition in which the projection position adjusting device 8 is completed, the second biasing member 88B biases the second moving plate 83 against the auxiliary plate 84 in the −Y-axis direction (downward). Namely, the engaging projection 834 of the second moving plate 83 is biased against the engaging recessed section 840 of the auxiliary plate 84 in the −Y-axis direction (downward).

Accordingly, the gaps between the second moving plate 83 and the auxiliary plate 84 caused by the manufacturing tolerances can be eliminated by the second biasing member 88B, thus it becomes possible to preferably move the second moving plate 83 without any jerky movements when moving the second moving plate 83 in the X-axis direction. Therefore, surging motion of the projection position can be eliminated when moving the second moving plate 83 in the X-axis direction to adjust the projection position in the X-axis direction, thus the projection position can be adjusted with further accuracy.

6-2. Configuration of Projection Lens 3

Figure 11:
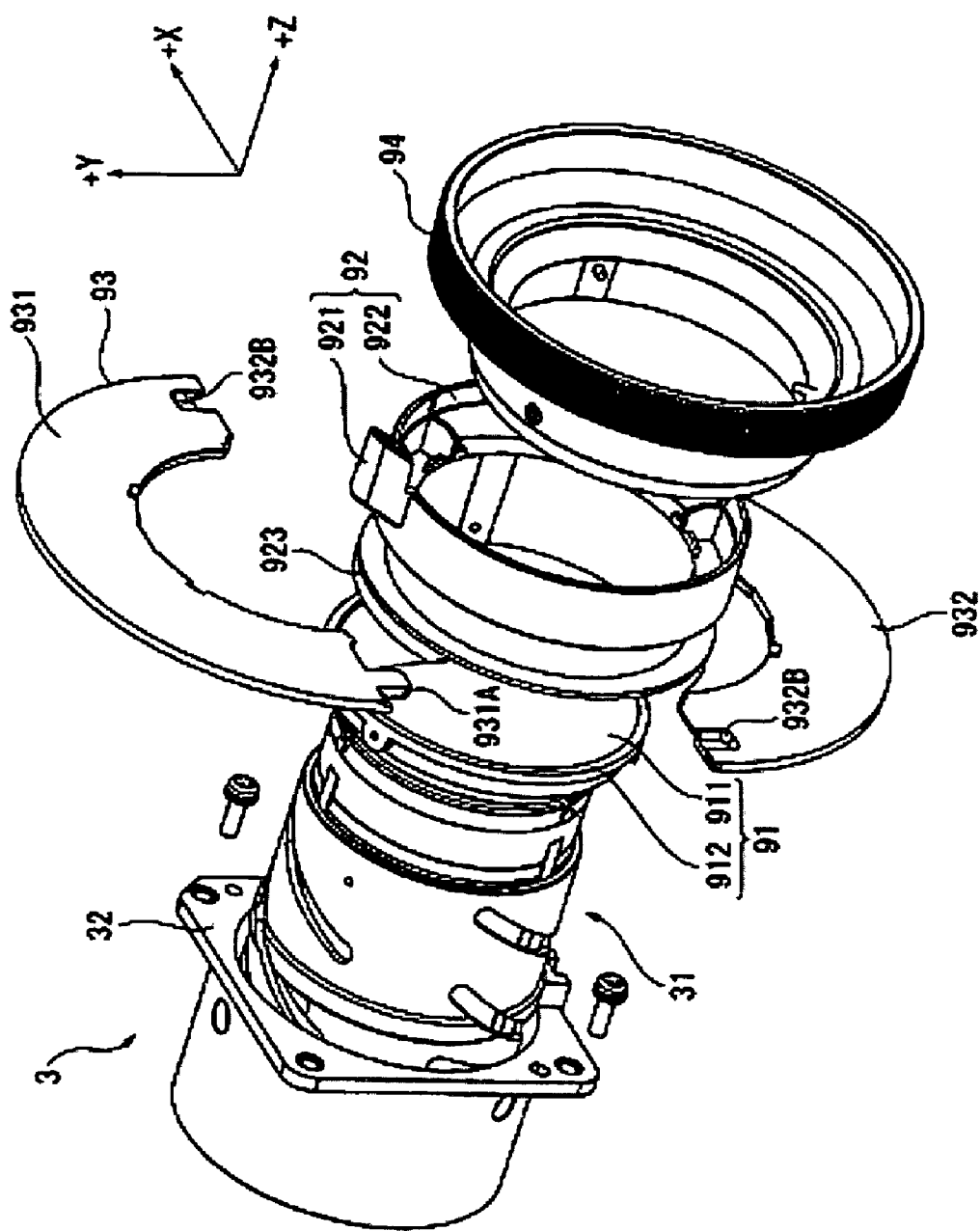
FIG. 11 is an exploded perspective view showing the structure of the projection lens according to the embodiment.

FIG. 11 is an exploded perspective view showing the structure of the projection lens 3. It should be noted that, in FIG. 11, similarly to FIGS. 6 through 8, it is assumed that the projection direction of the projection lens 3 is denoted as Z-axis and two axes perpendicular to the Z-axis are denoted as X-axis (horizontal axis) and Y-axis (vertical axis).

The projection lens 3 is provided with the body tube 31 and the flange section 32 as shown in FIG. 11. And, the body tube 31 is provided with a lens section 91, zoom adjustment ring 92, a flange ring 93, and a focus adjustment ring 94.

The lens section 91 is provided with a lens 911 and a lens frame 912 for supporting the lens 911. The lens 911 is a circular lens with a diameter substantially equal to the cylinder diameter of the body tube 31 of the projection lens 3. The lens section 91 is disposed inside the body tube 31.

The zoom adjustment ring 92 is fitted to the body tube 31 and makes the body tube 31 change the position of the lens section 91 in accordance with the movement of a knob 921, thus performing magnification adjustment of the projected image.

Specifically, the zoom adjustment ring 92 is, as shown in FIG. 11, a member having a substantially cylindrical shape with a larger diameter than the body tube 31 of the projection lens 3. The zoom adjustment ring 92 is provided with the knob 921 formed on the outer periphery surface of the cylindrical shape so as to protrude outside as shown in FIG. 11. And, when the knob 921 is operated by a user to be moved in the circumferential direction, the zoom adjustment ring 92 is rotated around the cylindrical axis.

The zoom adjustment ring 92 is attached to a member (not shown), which rotates to change the position of the lens section 91 for performing magnification adjustment of the projected image, among various members forming the body tube 31, and makes the member rotate by the circumferential rotation thereof.

Further, on the −Z-axis direction end section of the cylindrical side face of the zoom adjustment ring 92, there is formed a ring frame section 922 bulged outward from the circumference of the cylinder. On the outer circumference of the ring frame section 922, there is formed an engaging groove 923 hollowing towards the cylindrical center along the circumference of the cylinder.

The flange ring 93 is, as shown in FIG. 11, a ring-like member fitted to the circumference of the cylindrical zoom adjustment ring 92, and composed of a first flange 931 and a second flange 932 as extending segments.

Each of the first and the second flanges 931, 932 is a semicircular plate member defined by expanding on the circumference a semicircle centered on the axis of the cylinder of the body tube 31 along a plane perpendicular to the Z-axis direction. And, the inner circumference of each of the first and the second flanges 931, 932 has substantially the same diameter as the outer circumference of the ring frame section 922.

In the first flange 931, in one peripheral end section, there is formed a locking projection 931A having a slightly thinner Z-axis direction size than the Z-axis direction size of the first flange 931 and protruding along the circumferential direction. And, in the other peripheral end section of the first flange 931, there is formed an engaging recessed section 931B having a slightly thinner Z-axis direction size than the Z-axis direction size of the first flange 931 and hollowing towards the −Z-axis direction.

In the peripheral end sections of the second flange 932, there are respectively formed a locking projection (not shown) and an engaging recessed section 932B similar to the locking projection 931A and the engaging recessed section 931B of the first flange 931.

The first flange 931 and the second flange 932 are fitted to the engaging groove 923 of the ring frame section 922 at the inner circumferential ends, thus the first and the second flanges are attached to the zoom adjusting ring 92. And, the locking projection 931A of the first flange 931 and the engaging recessed section 932B of the second flange 932 are engaged along the peripheral direction and the locking projection of the second flange 932 and the engaging recessed section 931B of the first flange 931 are engaged along the peripheral direction, while fitting the inner circumferential ends of the first and the second flanges 931, 932 to the engaging groove 923 of the ring frame section 922, thereby forming the flange ring 93.

The focus adjustment ring 94 is attached to a member (not shown), which rotates to change the position of the lens section 91 for performing focus adjustment of the projected image, among various members forming the body tube 31, and makes the member rotate by the circumferential rotation thereof. The focus adjustment ring 94 is formed to have a circular frame shape in the plan view as shown in FIG. 11.

7. Configuration of Reference Position Detecting Mechanism 10

Figure 12:
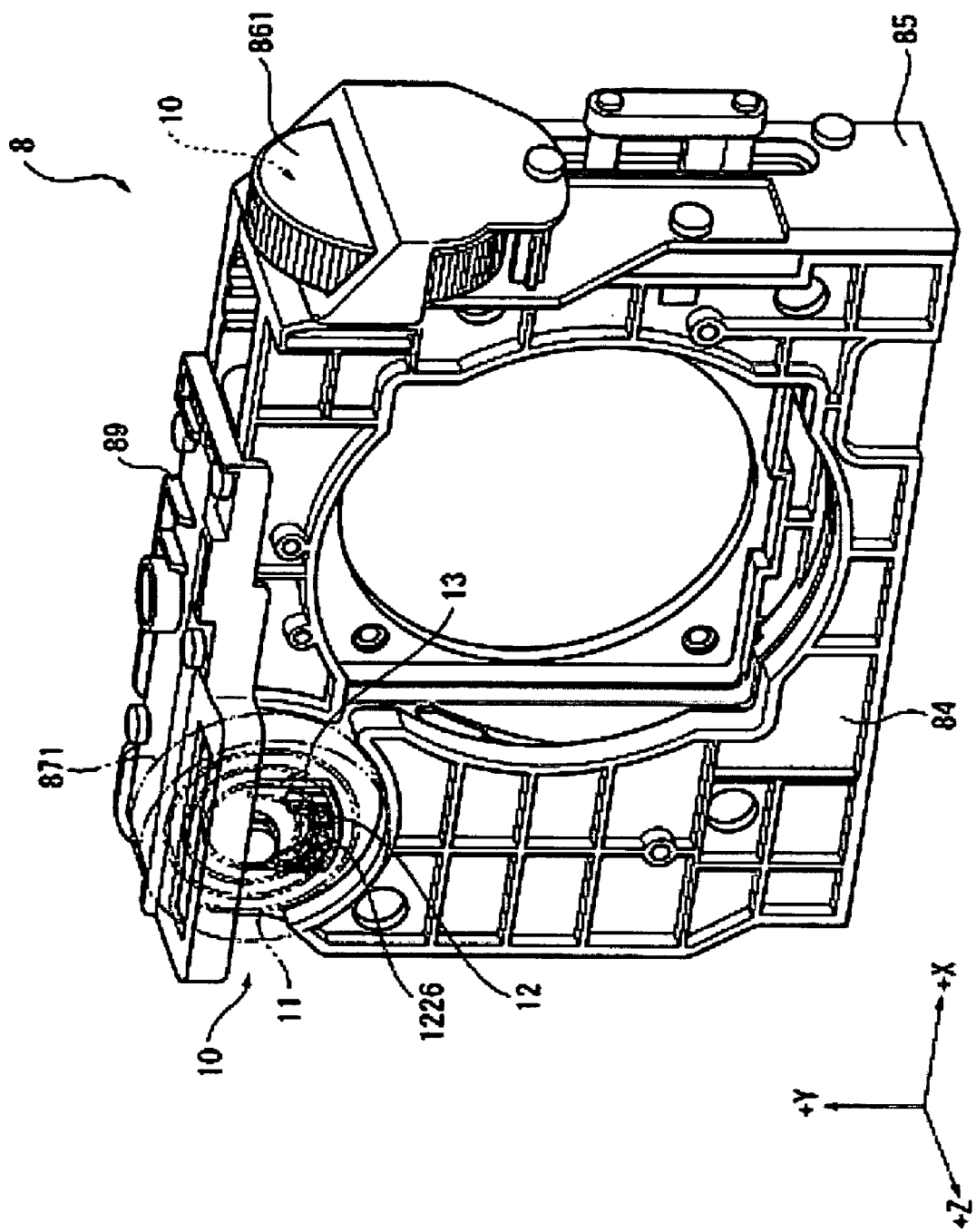
FIG. 12 is a perspective view showing the structure of a reference position detecting mechanism according to the embodiment.
Figure 13:
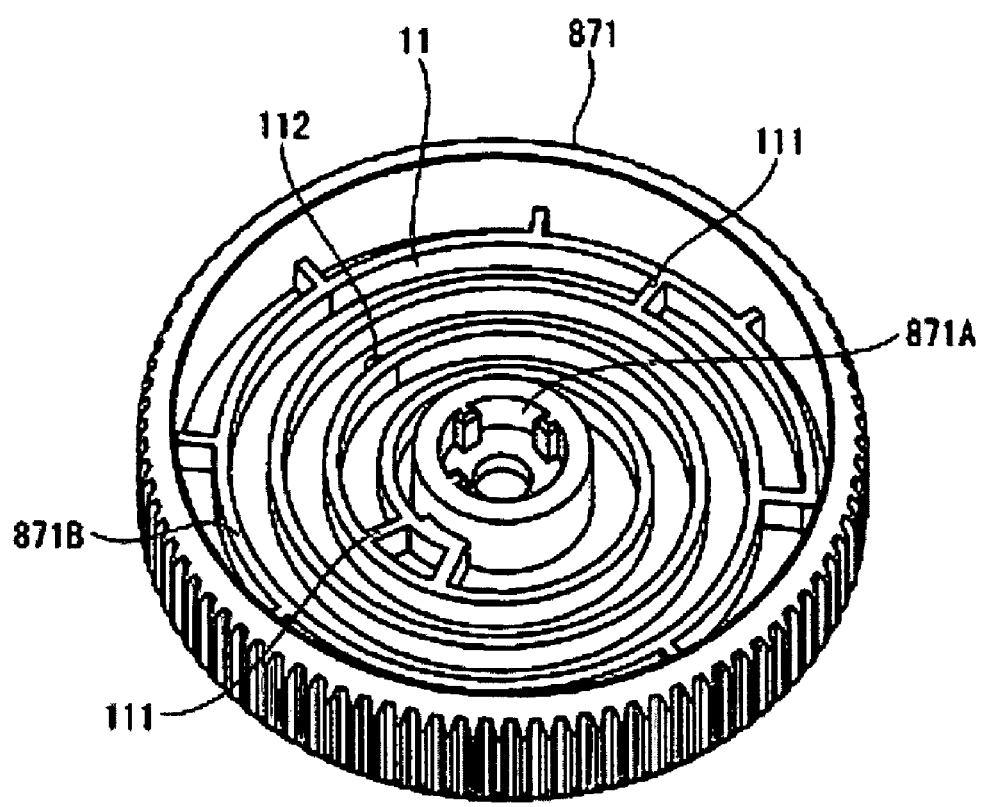
FIG. 13 is a perspective view showing the structure of the reverse side of the dial knob according to the embodiment.
Figure 14:
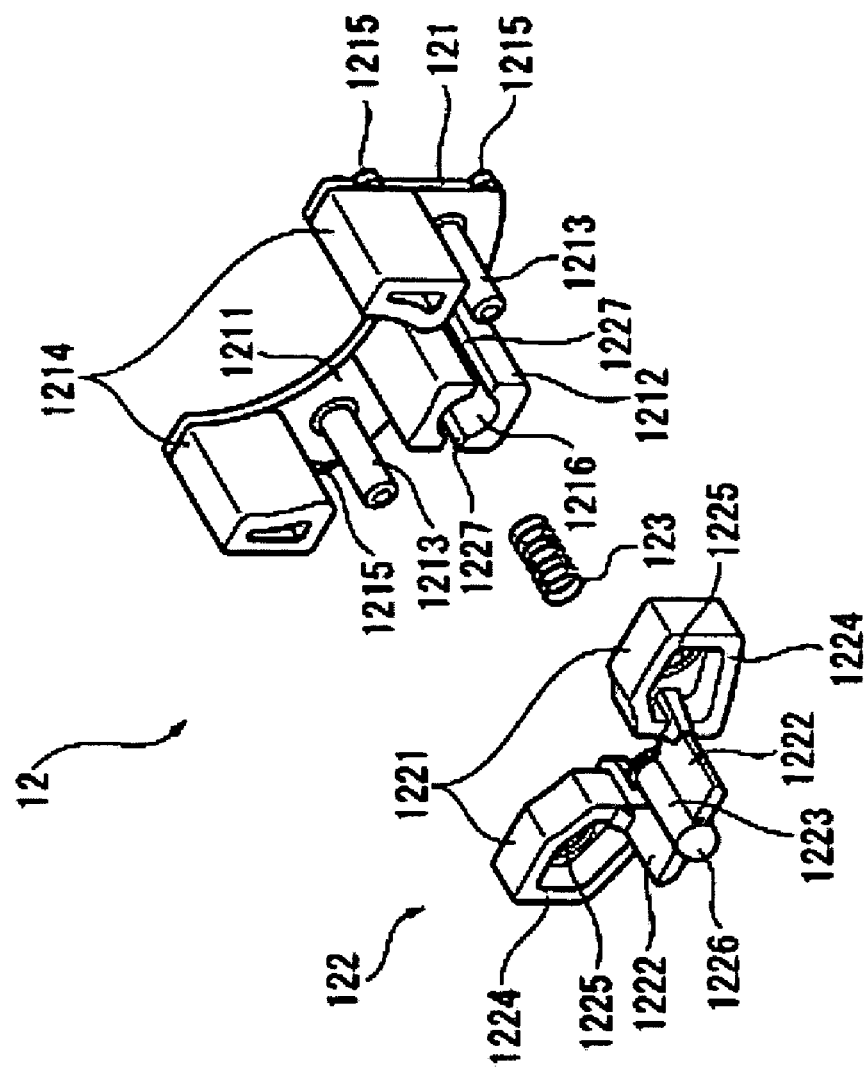
FIG. 14 is an exploded perspective view showing the structure of a sliding member according to the embodiment.
Figure 15:
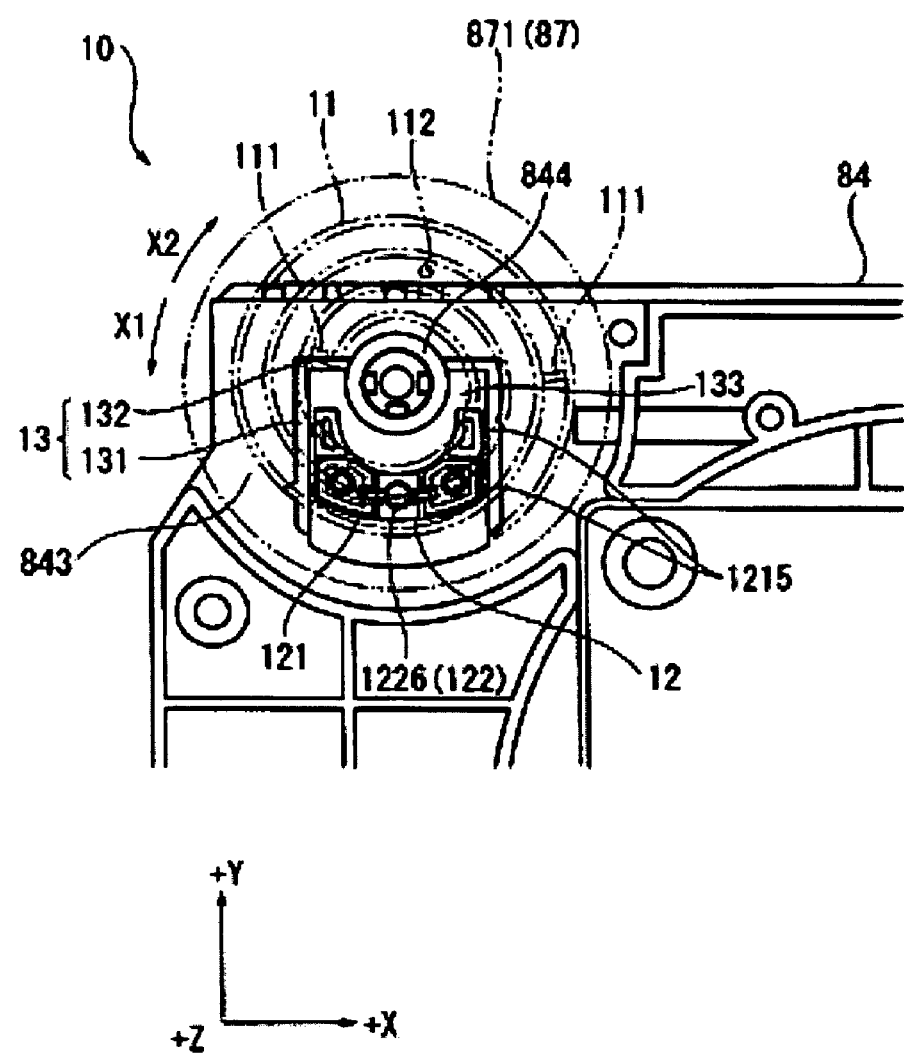
FIG. 15 is a front elevation view of the reference position detecting section according to the embodiment for explaining a structure and an operation thereof.

The reference position detecting mechanism 10 will now be explained with reference to FIGS. 12 through 15. FIG. 12 is a view showing an overall view of the reference position detecting mechanism 10. FIGS. 13 and 14 are views showing some members configuring the reference position detecting mechanism 10. FIG. 15 is a diagram for explaining the operation of the reference position detecting mechanism 10.

It should be noted that, in FIGS. 12 and 15, similarly to FIGS. 6 through 8, it is assumed that the projection direction of the projection lens 3 is denoted as Z-axis and two axes perpendicular to the Z-axis are denoted as X-axis (horizontal axis) and Y-axis (vertical axis).

The reference position detecting mechanism 10, in the present embodiment, detects the center position of a moving path of the projection position moving in a plane perpendicular to the projection direction as the projection reference position, namely, the center of the moving range in the X-axis direction, in which the projection lens 3 is moved by the projection position adjusting device 8, and the center of the moving range in the Y-axis direction, in which the projection lens 3 is moved by the projection position adjusting device 8, are detected as the projection reference position.

The reference position detecting mechanism 10 is respectively disposed between the supporting plate 85 and the dial knob 861, and between the auxiliary plate 84 and the dial knob 871 as shown in FIG. 12. Among the above, the reference position detecting mechanism 10 intervening between the supporting plate 85 and the dial knob 861 detects the center of the moving range in the Y-axis direction of the projection lens 3. On the contrary, the reference position detecting mechanism 10 intervening between the auxiliary plate 84 and the dial knob 871 detects the center of the moving range in the X-axis direction of the projection lens 3.

Either of the reference position detection mechanisms 10 have the same configurations and the same operational advantages. Therefore, in the following descriptions, the reference position detecting mechanism 10 intervening between the dial knob 871 and the auxiliary plate 84 is explained as a representative.

The reference position detecting mechanism 10 is provided with a spiral rail 11 formed on the dial knob 871, a sliding member 12 as a sliding section, and a vertical motion rail 13 formed on the auxiliary plate 84 as shown in FIG. 12.

FIG. 13 is a perspective view showing the configuration of the reverse side (the side of the auxiliary plate 84) of the dial knob 871.

As shown in FIG. 13, the reverse side of the dial knob 871 is hollowed out towards the adverse side.

The spiral rail 11 is erected on the bottom of the hollowed area, and is composed of a spiral erected section 871B formed in a spiral manner centered on the hole 871A and towards the periphery of the dial knob 871. Namely, the spiral rail 11 is a groove formed in a spiral manner along the rotational direction of the dial knob. It should be noted that the spiral rail 11 corresponds to a guide section according to the invention.

Further, the spiral rail 11 is, as shown in FIG. 13, provided with rotation stoppers 111 and a rail engaging hole 112.

The rotation stoppers 111 are erected at a position adjacent to the hole 871A and at a position adjacent to the periphery of the dial knob 871, respectively, so as to be perpendicular to the running direction of the spiral rail 11 to terminate the spiral rail 11.

As described above, in the projection position adjusting device 8 (see FIGS. 6 through 8), the second moving plate 83 (see FIG. 8) is reciprocated in the X-axis direction in accordance with the rotation of the dial knob 871. The two rotation stoppers 111 are respectively formed at positions where a sliding head 1226 for sliding in the spiral rail 11 is abutted in the rotational direction when the second moving plate 83 reaches the terminal positions in the moving range in the X-axis direction with respect to the auxiliary plate 84 (see FIG. 8).

The rail engaging hole 112 corresponds to a engaging section of the invention, and hollowed on the bottom of the groove of the spiral rail 11 to have a circular shape. The rail engaging hole 112 is formed at the middle of two rotation stoppers 111 on the spiral rail 11.

FIG. 14 is an exploded perspective view showing the configuration of a sliding member 12.

The sliding member 12 is a symmetric member having a crescent shape, and is provided with a base section 121, a sliding body 122 supported by the base section 121, and a spring 123 intervening between the base section 121 and the sliding body 122 as shown in FIG. 14.

The base section 121 is provided with a base plate 1211, a hollow support 1212, a pair of cylindrical projections 1213 as a projection section, two tip posts 1214, and four small circular lugs 1215.

Among the above, the base plate 1211 is a plate member having a substantially crescent shape.

The hollow support 1212 is erected at the center (on the axis of symmetry of the substantially crescent shape) of the base plate 1211. The hollow support 1212 is provided with a cylindrical space 1216 and valley sections 1217.

The cylindrical space 1216 is formed by penetrating in the protruding direction in the hollow support 1212 so as to have a circular cross-sectional shape. And, the cylindrical space 1216 is connected to a hole formed on the base plate 1211. The valley sections 1217 is formed by notching the hollow support in the valley-shape along the chord of the substantially crescent shape of the base plate 1211 from the both sides of the hollow support 1212 towards the cylindrical space 1216.

The two cylindrical projections 1213 are protruded to form cylinders and disposed in parallel to each other along the chord direction across the hollow support 1212. Namely, a line connecting the two cylindrical projections 1213 and the valley sections 1217 described above are formed in line.

The two tip posts 1214 are erected on the base plate 1211 at the both acute-angled end sections.

The four small circular lugs 1215 are formed in the outer periphery side face of the base plate 1211 on the two side faces parallel to the direction of the axis of symmetry of the substantially crescent shape, two by two along the direction of the axis of symmetry. The small circular lugs 1215 each protrude from the side faces of the base plate 1211 along the chord direction having a cylindrical face on the tip thereof.

The sliding body 122 is a member to be stacked on the base section 121 to be assembled as described above, and is a symmetric member with substantially Y-shape as shown in FIG. 14. The sliding body 122 is provided with a wing section 1221, two handy-grip sections 1222, and a pivot shaft 1223 as an axis of symmetry.

The wing section 1221 is composed of two substantially cuboid members 1224 disposed in parallel to each other in the chord direction on a plane parallel to the base plate 1211 of the base section 121. The substantially cuboid member 1224 is hollowed out from the opposite side face to the base section 121 towards the base section 121, and the bottom of the hollowed area is provided with an insertion hole 1225 penetrating in the overlapping direction with the base section 121. As shown in FIG. 15, the pair of cylindrical projections 1213 of the base section 121 are respectively inserted in the pair of insertion holes 1225.

The two handy-grip sections 1222 are each extended from an inner end face of the respective one of the substantially cuboid members 1224 of the wing section 1221. Specifically, the handy-grip section 1222 is a plate-like member parallel to the surface defined by the chord direction and the overlapping direction, and extended in the overlapping direction receding from the base section 121. The pair of handy-grip sections 1222 is, as shown in FIG. 15, respectively inserted in the pair of valley sections 1217 formed on the hollow support 1212 of the base section 121.

The pivot shaft 1223 is a cylindrical shaft member supported by the two handy-grip sections 1222 and extended in the overlapping direction. The pivot shaft 1223 is provided with a cylindrical space (not shown) and the sliding head 1226.

The cylindrical space is hollowed in the pivot shaft 1223 from the side of the base section 121 along the overlapping direction to form a cylindrical shape. The inner diameter of the cylindrical space is substantially the same as the cylindrical space 1216 formed in the hollow support 1212 of the basic section 121.

The sliding head 1226 is a tip portion of the pivot shaft 1223 on the side opposite to the base section 121, and is formed to have a hemispheric shape. The sliding head 1226 slidably abuts on the inside of the spiral rail 11 of the dial knob 871 in accordance with the rotation of the dial knob 871, as shown in FIG. 15, in the condition in which the reference position detecting mechanism 10 is completed.

The spring 123 has a spiral form with substantially the same diameter as the cylindrical space 1216 of the base section 121 and the cylindrical space formed in the pivot shaft 1223 of the sliding body 122. Further, the size of the spring 123 in the overlapping direction is substantially the same as the total of the sizes of these two cylindrical spaces in the overlapping direction. It should be noted that the spring 123 is fitted in the cylindrical space 1216 in one end, and is fitted in the cylindrical space of the sliding body 122 in the other end thereof.

As described above, since the base section 121 and the sliding body 122 are assembled with the spring 123 intervening therebetween, the sliding body 122 becomes retractable in the overlapping direction against the base section 121, and further, pivotable around the pivot shaft 1223 with respect to the base section 121.

In the condition in which the reference position detecting mechanism 10 is completed, the sliding head 1227 always presses the reverse face of the dial knob 871 under the action of the spring 123, and is pivoted, in accordance with rotation of the dial knob 871, in the direction of the rotation.

It should be noted that if the sliding body 122 is caused to pivot in the direction traversing the chord direction, the edge of the insertion hole 1225 of the sliding body 122 is stopped by the cylindrical projections 1213 of the base section 121, thus the pivoting movement of the sliding body 122 in the direction traversing the chord direction is restricted. Further, since the handy-grip section 1222 is inserted in the valley section 1217, the pivoting movement of the sliding body 122 in the direction traversing the chord direction is also restricted here.

Namely, in the condition in which the reference position detecting mechanism 10 is completed, the pivoting movement of the sliding body 122 in the direction traversing the rotational direction of the dial knob 871 is restricted.

The vertical motion rail 13 is a rail protruding towards the +Z-axis direction on the recessed section 843 of the auxiliary plate 84 as shown in FIG. 15.

The vertical motion rail 13 is composed of two vertical rails 131 extending in the −Y-axis direction from positions at a predetermined distance from the pivot section 844 in the X-axis direction on both sides, and horizontal rails 132 extending from the +Y-axis direction side end section of each of the vertical rails 131 to the pivot section 844. It should be noted that the distance in the X-axis direction between the two vertical rails 131 is substantially equal to the size of the base plate 1211 (see FIG. 14) of the sliding member 12 in the chord direction.

Further, on a substantially rectangular area of the auxiliary plate 84 surrounded by the two vertical rails 131 and the horizontal rails 132, there is formed a recessed face 133 (see FIG. 8) further hollowed from the recessed section 843 in the −Z-axis direction.

As shown in FIG. 15, the recessed face 133 is provided with a sliding member 12 disposed so that the chord direction becomes parallel to the X-axis direction, and in side faces of the two vertical rails 131 adjacent to the recessed face 133, there are abutted tips of the small circular lugs 1215 of the base section 121.

The operation of the reference position detecting mechanism 10 in accordance with rotation of the dial knob 871 will be explained with reference to FIG. 15.

Firstly, the case in which the dial knob 871 is rotated in the X2 direction is considered.

In the sliding member 12, when the dial knob 871 starts turning in the X2 direction, the sliding head 1226 receives the force in the rotational direction (−X-axis direction) of the dial knob 871 caused by the friction with the bottom face of the groove of the spiral rail 11. Thus, the sliding body 122 inclines in the rotational direction (−X-axis direction) around the hollow support 1212 (see FIG. 14). And, when the dial knob 871 is continuously turned in the X2 direction, the sliding head 1226 slides on the bottom of the groove of the spiral rail 11 along the rotational direction while inclining in the rotational direction (−X-axis direction).

As described above, when the sliding head 1226 slides on the bottom face of the groove of the spiral rail 11 in accordance with the rotation of the dial knob 871 in the X2 direction, the position in the spiral rail 11 where the sliding head 1226 slides is moved from an outer part of the spiral to an inner part of the spiral. Then, the sliding head 1226, which abuts on the bottom face of the groove of the spiral rail 11, receives the force in the +Y-axis direction from the wall face of the groove of the spiral rail 11. Accordingly, the sliding member 12 moves +Y-axis direction with respect to the auxiliary plate 84 while sliding the small circular lugs 1215 on the vertical rails 131.

Then, the case in which the dial knob 871 is rotated in the X1 direction is considered. Since the rotational direction of the dial knob 871 is reversed, the operation directions of the members of the reference position detecting mechanism 10 are reversed from the case with the X2 direction described above.

Namely, in the sliding member 12, when the dial knob 871 starts turning in the X1 direction, the sliding head 1226 receives the force in the rotational direction (+X-axis direction) of the dial knob 871 caused by the friction with the bottom face of the groove of the spiral rail 11. Thus, the sliding body 122 inclines in the rotational direction (+X-axis direction) around the hollow support 1212. And, when the dial knob 871 is continuously turned in the X1 direction, the sliding head 1226 slides on the bottom of the groove of the spiral rail 11 along the rotational direction while inclining in the rotational direction (+X-axis direction).

As described above, when the sliding head 1226 slides on the bottom face of the groove of the spiral rail 11 in accordance with the rotation of the dial knob 871 in the X1 direction, the position in the spiral rail 11 where the sliding head 1226 slides is moved from an inner part of the spiral to an outer part of the spiral. Then, the sliding head 1226, which abuts on the bottom face of the groove of the spiral rail 11, receives the force in the −Y-axis direction from the wall face of the groove of the spiral rail 11. Accordingly, the sliding member 12 moves −Y-axis direction with respect to the auxiliary plate 84 while sliding the small circular lugs 1215 on the vertical rails 131.

By the vertical movement of the sliding member 12 as described above, the sliding head 1226 smoothly slides on the spiral rail 11, and accordingly the dial knob 871 is smoothly rotated.

The operation of the reference position detecting mechanism 10 in the case in which the rotational direction of the dial knob 871 is switched, for example, the dial knob 871 in the rotational operation in the X2 direction is started rotating in the X1 direction, will now be explained.

In this case, the sliding body 122 inclining in the rotational direction of X2 (−X-axis direction) around the hollow support 1212 inclines in the rotational direction of X1 (+X-axis direction) according to the friction caused between the sliding head 1226 and the spiral rail 11. The displacement of the sliding head 1226 in the rotational direction caused by the pivoting movement corresponds to an amount of backlash caused between the gears 872 through 874 in the second adjusting drive section 87 (see FIG. 8).

According to such a configuration and the operation, it is possible not to slide the sliding head 1226 along the spiral rail 11 while the backlash is caused in the mesh between the gears 872 through 874 in accordance with switching of rotational direction of the dial knob 871. Therefore, in the projector 1, an error in detecting the center of the moving range of the projection lens 3 in the X-axis direction caused by the backlash between the gears 872 through 874 can be reduced.

As described above, when the sliding head 1226 continues to slide on the bottom face of the groove of the spiral rail 11 in accordance with the rotation of the dial knob 871, the sliding head 1226 is eventually engaged with the rail engaging hole 112 formed on the bottom face of the groove of the spiral rail 11. In this case, the sliding head 1226 expands to the side of the dial knob 871 (+Z-axis direction) with the help of restoring force of the spring 123. Further, the dial knob 871 is further rotated, the spring 123 is contracted to release the engagement between the sliding head 1226 and the rail engaging hole 112. And, the sliding head 1226 slides again on the bottom face of the groove of the spiral rail 11. The engagement and release between the sliding head 1226 and the rail engaging hole 112 cause the dial knob 871 a slight vibration and click sound. The user who is rotating the dial knob 871 can feel the vibration of the dial knob 871 by hand.

As described above, the rail engaging hole 112 is formed at the position where the sliding head 1226 is engaged therewith when the projection lens 3 reaches the center position of the movable range. Namely, when the slight vibration and the click sound are caused on the dial knob 871 under rotation, the projection lens 3 locates at the center of the movable range in the X-axis direction, and accordingly it can be assumed that the projection position is also located at the center of the moving path in the X-axis direction.

Thus, while a user is adjusting the projection position turning the dial knob 871, the user can recognize the projection position when the vibration of the dial knob 871 or the click sound is felt as the central position in the moving path in the X-axis direction. Therefore, according to the projector 1, it is possible to notice the user that the projection position reaches the center position of the moving path in the X-axis direction in adjusting the projection position, with relatively simple configuration and in a manner easy-to-understand to the user.

Further, the sliding body 122 pressing the bottom face of the groove of the spiral rail 11 moves in the pressing direction to be engaged with the rail engaging hole 112. The vibration caused on the dial 871 and the click sound caused by the engagement become clear. Therefore, the user can clearly feel the vibration of the dial knob 871 and the click sound, it can more clearly be recognized that the projection position reaches the center position of the moving path in the X-axis direction.

Further, when the dial knob 871 is further rotated, and the second moving plate 83 is moved by the second adjusting drive section 87 to the moving termination position in the projection position adjusting device 8, the sliding head 1226 abuts on the rotation stopper 111 in the reference position detecting mechanism 10. Since the sliding head 1226 is abutted on the rotation stopper 111, the dial knob 871 becomes impossible to be rotated any further. Namely, in the projector 1, when the second moving plate 83 reaches the moving termination position, the rotation of the dial knob 871 is restricted.

Therefore, in the projector 1, it can be prevented that load is applied to various members in the projection position adjusting device 8 when the dial knob 871 is further rotated after the second moving plate 83 reaches the moving termination position.

According to the embodiment, the sliding head 1226 slides on inside the spiral rail 11, and reciprocates in the Y-axis direction on the auxiliary plate 84 in accordance with the position in the spiral. Accordingly, the sliding head 1226 never slides on the same position on the spiral rail 11 twice while the dial knob 871 is rotated in the same direction.

Namely, if the rail engaging hole 112 formed on the spiral rail 11 is unique, the engagement and release between the sliding head 1226 and the rail engaging hole 112 is performed only once in rotating the dial knob 871 in the same direction. Therefore, the invention can be applied to a projector equipped with the projection position adjusting device 8 having a large moving area of the second moving plate 83 in the X-axis direction.

8. Modification of Embodiment

Although the most preferable configuration for putting the invention into practice and so on are disclosed in the above descriptions, the invention is not limited thereto. Namely, the embodiments described above are not for limiting the invention thereto, and accordingly a description using names of components without using a part of or the whole of the limitations thereof such as shapes or materials is included in the invention.

Although in the embodiment, the projection reference position is assumed to be the center of the moving range of the projection lens 3, the invention is not limited thereto.

Although in the embodiment, the spiral rail 11 is adopted as the guiding section, a circumferential rail can also be adopted in the invention. According to this configuration, by forming a single rail engaging hole 112 in the circumferential rail, the dial knobs 861, 871 vibrate every revolution of respective dial knobs 861, 871. Namely, the user can recognize a predetermined amount of movement of the projection lens 3 by the vibrations of the dial knobs 861, 871.

Although in the embodiment described above, the spiral rail 11 is assumed to be a rail with a groove having a rectangular cross-sectional shape as shown in FIG. 13, the invention is not limited thereto. For example, the spiral rail 11 can be configured to be a groove having a semicircular cross-sectional shape corresponding to the shape of the sliding head 1226. Accordingly, the jerky movement of the sliding head 1226 inside the spiral rail 11 in the direction traversing the rotational direction of the dial knobs 861, 871 can be prevented.

In the invention, it is sufficient for the sliding section and the engaging section to have shapes to be engaged with each other. For example, the engaging section can be a projection slightly projected from the bottom face of the groove of the spiral rail 11.

Although in the embodiment, the first moving plate 82 is moved in the Y-axis direction by driving the first adjusting drive section 86, and the second moving plate 83 is moved in the X-axis direction by driving the second adjusting drive section 87, it is not a limitation. For example, a configuration in which the first moving plate is moved in the X-direction by driving the first adjusting drive section and the second moving plate is moved in the Y-direction by driving the second adjusting drive section can also be adopted.

Although in the embodiment the projection position adjusting device 8 it is assumed that the projection lens 3 can be moved in both of the X-axis and Y-axis directions perpendicular to the projection direction, the projection position adjusting device 8 in the invention can have a configuration in which the projection lens 3 can only be moved in either one of those directions.

Although in the embodiment the configuration with the optical unit 4 having a substantially L-shape in the plan view is explained, it is not a limitation. For example, a configuration with a substantially U-shape in the plan view can also be adopted.

Although in the embodiment, the projector 1 using three liquid crystal panels 441 is only cited, the invention can be applied to a projector using only one liquid crystal panel, a projector using two liquid crystal panels, or a projector using four or more of liquid crystal panels.

Although in the embodiment, the transmissive liquid crystal panel having the entrance surface and the exit surface separately is used, the reflective liquid crystal panel having a common surface used as both the entrance surface and the exit surface can also be used.

Although the liquid crystal panel is used as the optical modulation device, an optical modulation device other than the liquid crystal panel such as a device using micromirror can also be adopted. In this case, the polarization plates in the light beam entrance side and in the light beam exit side can be eliminated.

Although in the embodiment, only an example of the front type of projector for performing projection from the direction in which the screen is observed is cited, the invention can be applied to rear projectors for performing projection from the direction opposite to the direction in which the screen is observed.

The invention can be applied to a projector.

The entire disclosure of Japanese Patent Application No. 2005-257906 filed Sep. 6, 2005 is expressly incorporated by reference herein.

What is claimed is:

1. A projector comprising:
   a light source;
   an optical modulation device that modulates light beam emitted from the light source in accordance with image information to form an optical image;
   a projection optical device that projects the optical image formed by the optical modulation device in an enlarged manner; and
   a projection position adjusting device that moves the projection optical device in a plane perpendicular to a projection direction to adjust the projection position of the projection optical device; wherein, the projection position adjusting device includes:
      a fixed member fixed to the projector;
      a moving member capable of moving along the plane perpendicular to the projection direction with respect to the fixed member;
      a dial knob supported rotatably with respect to the fixed member and operable by a user;
      a drive mechanism that is engaged with the moving member and the dial knob, and transmits rotation of the dial knob to the moving member to move the moving member; and
      a reference position detecting mechanism that is disposed between the fixed member and the dial knob, and detects a projection reference position of the projection optical device, the reference position detecting mechanism including:
         a spiral rail guiding section provided to a side face of the dial knob adjacent to the fixed member, along the rotational direction of the dial knob, and having a groove shape, the spiral rail guiding section having a rotation stopper configured to stop rotation of the dial knob at a position corresponding to a moving termination position of the moving member;
         a sliding section that is provided to the fixed member, and slides in the guiding section in accordance with the rotation of the dial knob; and
         an engaging section that is provided to the guiding section, and engages with the sliding section in the case in which the projection position of the projection optical device reaches the projection reference position.

2. The projector according to claim 1, wherein the engaging section is a recessed section provided to the bottom of the guiding section, and the sliding section slides in accordance with the rotation of the dial knob while pressing the bottom of the guiding section and engages with the engaging section in the case in which the projection position of the projection optical device reaches the projection reference position.

3. The projector according to claim 1, wherein the guiding section has a spiral shape along the rotational direction of the dial knob, and the sliding section is attached to the fixed member movably in a direction perpendicular to the rotational direction of the dial knob.

4. The projector according to claim 1, wherein the sliding section includes a sliding body including a sliding head that engages with the engaging section, and a base section that is attached to the fixed member, and supports the sliding body so that the sliding head swings according to the rotational direction of the dial knob.

5. The projector according to claim 4, wherein the base section is provided with a pair of projections projected towards the sliding body at positions symmetrical with the rotational direction of the dial knob with respect to the sliding head in the condition in which the base section supports the sliding body, and the sliding body is provided with a pair of insertion holes to which the pair of projections are respectively inserted.

6. The projector according to claim 1, wherein the guiding section is provided with a second rotation stopper, which engages with the sliding section to stop rotation of the dial knob, at a position corresponding to a second moving termination position of the moving member.

* * * * *

UNITED STATES PATENT AND TRADEMARK OFFICE
CERTIFICATE OF CORRECTION

| | |
|---|---|
| PATENT NO. | : 7,635,190 B2 |
| APPLICATION NO. | : 11/507302 |
| DATED | : December 22, 2009 |
| INVENTOR(S) | : Kunihisa Nakamura |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 664 days.

Signed and Sealed this

Ninth Day of November, 2010

David J. Kappos
*Director of the United States Patent and Trademark Office*